US012192751B2

(12) United States Patent
Park et al.

(10) Patent No.: US 12,192,751 B2
(45) Date of Patent: Jan. 7, 2025

(54) METHOD AND APPARATUS FOR SWITCHING AERIAL BASE STATIONS IN WIRELESS COMMUNICATION SYSTEM

(71) Applicant: ELECTRONICS AND TELECOMMUNICATIONS RESEARCH INSTITUTE, Daejeon (KR)

(72) Inventors: Soon Gi Park, Daejeon (KR); Jun Sik Kim, Daejeon (KR); Seung Jae Bahng, Daejeon (KR); Jung Sook Bae, Daejeon (KR); Heesoo Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 399 days.

(21) Appl. No.: 17/826,569

(22) Filed: May 27, 2022

(65) Prior Publication Data

US 2022/0408331 A1    Dec. 22, 2022

(30) Foreign Application Priority Data

Jun. 15, 2021 (KR) .................. 10-2021-0077579

(51) Int. Cl.
*H04W 36/16* (2009.01)
*H04W 36/08* (2009.01)
(Continued)

(52) U.S. Cl.
CPC ....... *H04W 36/165* (2013.01); *H04W 36/083* (2023.05); *H04W 36/302* (2023.05); *H04W 36/00695* (2023.05); *H04W 84/005* (2013.01)

(58) Field of Classification Search
CPC ............ H04W 36/083; H04W 36/165; H04W 36/302; H04W 36/00695; H04W 84/005;
(Continued)

(56) References Cited

U.S. PATENT DOCUMENTS 6,879,829 B2    4/2005   Dutta et al.
2017/0208512 A1  7/2017   Aydin et al.
(Continued)

FOREIGN PATENT DOCUMENTS

EP    1559208 B1   11/2009
EP    2978258 A1    1/2016
(Continued)

OTHER PUBLICATIONS

Azade Fotouhi et al., "Flying Drone Base Staton for Macro Hotspots", IEEE Access, Mar. 21, 2018.

*Primary Examiner* — Dhaval V Patel
(74) *Attorney, Agent, or Firm* — LRK PATENT LAW FIRM

(57) ABSTRACT

A method for controlling base stations in a wireless communication system may include: performing a monitoring operation on a first base station forming a first cell in a predetermined communication area; determining whether the first base station needs to be replaced; when the first base station needs to be replaced, controlling a second base station to move in a direction of the first base station and form a second cell; when coverages of the first and second cells overlap fully or partially, decreasing a transmit power of the first base station and increasing a transmit power of the second base station; and in response to identifying that all of one or more communication nodes connected to the first cell are handed over to the second base station, determining that the first base station is successfully replaced with the second base station.

18 Claims, 15 Drawing Sheets

(51) Int. Cl.
*H04W 36/30* (2009.01)
*H04W 36/00* (2009.01)
*H04W 84/00* (2009.01)

(58) Field of Classification Search
CPC ...... H04W 36/38; H04W 84/06; Y02D 30/70; B64C 39/024; H04B 7/18502; B64U 2101/20
See application file for complete search history.

(56) References Cited

U.S. PATENT DOCUMENTS

2020/0178135 A1  6/2020  Yun et al.
2020/0225684 A1  7/2020  Anderson et al.

FOREIGN PATENT DOCUMENTS

KR   2017/0030442 A   3/2017
WO    2008/038980 A1   4/2008

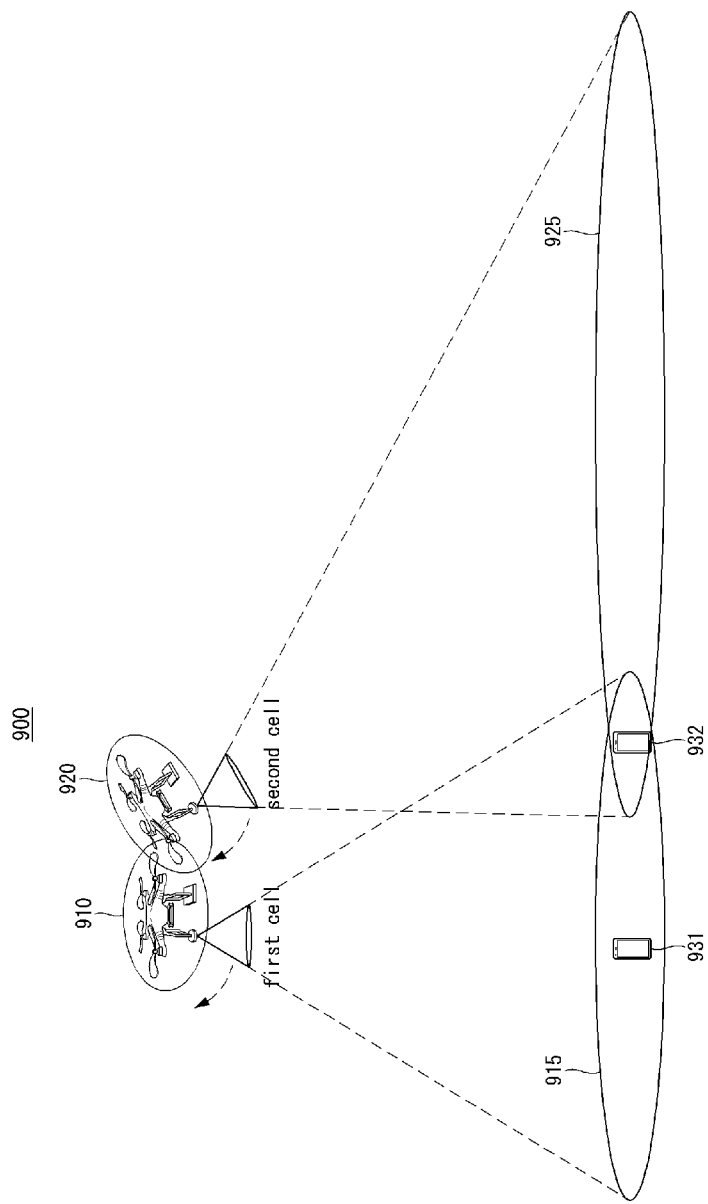

METHOD AND APPARATUS FOR SWITCHING AERIAL BASE STATIONS IN WIRELESS COMMUNICATION SYSTEM

CROSS-REFERENCE TO RELATED APPLICATION

This application claims priority to Korean Patent Application No. 10-2021-0077579 filed on Jun. 15, 2021 with the Korean Intellectual Property Office (KIPO), the entire contents of which are hereby incorporated by reference.

BACKGROUND

1. Technical Field

The present disclosure relates to a method and an apparatus for switching aerial base stations in a wireless communication system, and more particularly, to a method and an apparatus for replacing (or switching) an aerial base station (ABS), which is mounted on an aerial vehicle such as a drone and provides services to terminals, etc., to another ABS.

2. Description of Related Art

With the development of information and communication technology, various wireless communication technologies are being developed. Representative wireless communication technologies include long term evolution (LTE) and new radio (NR) defined as the $3^{rd}$ generation partnership project (3GPP) standards. The LTE may be one of $4^{th}$ generation (4G) wireless communication technologies, and the NR may be one of $5^{th}$ generation (5G) wireless communication technologies.

Recently, the use of aerial vehicles (AVs) unmanned aerial vehicles (UAVs), such as drones, has been widely spread around the world. In the 5G or later wireless communication technology, research for constructing a radio access network using a base station (hereinafter, referred to as an 'aerial base station (ABS)' mounted on an aerial vehicle is being conducted. The ABS has an advantage of being mounted on an AV such as a drone, airship, or air balloon to form cell coverage in a disaster situation or a place where the existing communication infrastructure is not constructed and to provide services to users or terminals. In addition, since the ABS transmits and receives radio signals in the air, it may have an advantage that it is less likely to experience a communication failure due to obstacles on a communication path, compared to a base station installed on the ground.

Meanwhile, the ABS may have restrictions on a flight time due to limitations such as fuel or battery for providing power. Accordingly, in order to continuously provide a radio access network in a specific area through the ABS, it may be necessary to replace (or switch) the ABS whose fuel or battery is exhausted with another ABS. Here, in replacing one ABS providing services in a corresponding area with another ABS, techniques for continuously providing services being provided without interruption may be required. In other words, in performing the switching between ABSs, techniques for maintaining or guaranteeing connectivity of the services being provided may be required.

Matters described in the related art are prepared to enhance understanding of the background of the present disclosure, and may include matters that are not already known to those of ordinary skill in the art to which the technologies to be described belong.

SUMMARY

In order to solve the above-identified problems, exemplary embodiments of the present disclosure are directed to providing a method and an apparatus for switching aerial base stations while maintaining or guaranteeing connectivity of services being provided.

According to an exemplary embodiment of the present disclosure for achieving the above-described objective, a method for controlling base stations in a wireless communication system may comprise: performing a monitoring operation on a first base station that is mounted on a first aerial vehicle and forms a first cell in a predetermined communication area at a predetermined aerial position; determining whether the first base station needs to be replaced; in response to determining that the first base station needs to be replaced, controlling a second base station mounted on a second aerial vehicle to move in a direction of the first base station and form a second cell; in response to determining that coverages of the first and second cells overlap by more than a first reference value, decreasing a transmit power of the first base station and increasing a transmit power of the second base station; and in response to identifying that all of one or more communication nodes, which were connected to the first cell, are handed over to the second base station, determining that the first base station is successfully replaced with the second base station.

The performing of the monitoring operation may comprise: identifying at least one of a remaining amount of a power source of the first aerial vehicle, whether the first aerial vehicle or a first aerial vehicle system including the first base station operates normally, or a combination thereof.

The determining of whether the first base station needs to be replaced may comprise: in response to determining that the remaining amount of the power source of the first aerial vehicle is less than a first preset threshold, determining that the first base station needs to be replaced.

The determining of whether the first base station needs to be replaced may comprise: in response to determining that a part of one or more components constituting the first aerial vehicle system does not operate normally, determining that the first base station needs to be replaced.

The decreasing of the transmit power of the first base station and the increasing of the transmit power of the second base station may comprise: decreasing the transmit power of the first base station based on a first function; and increasing the transmit power of the second base station based on a second function.

The first and second functions may correspond to linear functions or non-linear functions that are configured to derive a constant function when mutually summed.

According to another exemplary embodiment of the present disclosure for achieving the above-described objective, a method for controlling base stations in a wireless communication system may comprise: performing a monitoring operation on a first base station that is mounted on a first aerial vehicle and forms a first cell in a predetermined communication area at a predetermined aerial position; determining whether the first base station needs to be replaced; in response to determining that the first base station needs to be replaced, controlling a second base station mounted on a second aerial vehicle to move in a direction of the first base station and form a second cell; in response to determining that coverages of the first and second cells overlap by more than a first reference value, changing each of the coverages of the first and second cells through physical controls on a first aerial vehicle system including the first base station and a second aerial vehicle system including the second base station; and in response to identifying that all of one or more communication nodes, which were connected to the first cell, are located out of the coverage of the first cell and located in the coverage of the second cell, determining that the first base station is successfully replaced with the second base station.

The performing of the monitoring operation may comprise: identifying at least one of a remaining amount of a power source of the first aerial vehicle, whether the first aerial vehicle or the first aerial vehicle system including the first base station operates normally, or a combination thereof.

In the changing of each of the coverages of the first and second cells, the coverages of the first and second cells may be respectively changed by moving a position of the first aerial vehicle and a position of the second aerial vehicle.

In the changing of each of the coverages of the first and second cells, the coverages of the first and second cells may be respectively changed by changing each of a direction in which the first aerial vehicle faces and a direction in which the second aerial vehicle faces.

In the changing of each of the coverages of the first and second cells, the coverages of the first and second cells may be respectively changed by changing each of a direction in which a first antenna of the first base station faces and a direction in which a second antenna of the second base station faces.

According to yet another exemplary embodiment of the present disclosure for achieving the above-described objective, an apparatus for controlling base stations in a wireless communication system may comprise: a processor; a memory electronically communicating with the processor; and instructions stored in the memory, wherein when executed by the processor, the instructions cause the apparatus to: perform a monitoring operation on a first base station that is mounted on a first aerial vehicle and forms a first cell in a predetermined communication area at a predetermined aerial position; determine whether the first base station needs to be replaced; in response to determining that the first base station needs to be replaced, control a second base station mounted on a second aerial vehicle to move in a direction of the first base station and form a second cell; in response to determining that coverages of the first and second cells overlap by more than a first reference value, perform at least one of an operation of controlling each of transmit powers of the first and second base stations and an operation of changing coverages of the first and second cells through physical controls on a first aerial vehicle system including the first base station and a second aerial vehicle system including the second base station; and in response to identifying that all of one or more communication nodes, which were connected to the first cell, are handed over to the second base station, determine that the first base station is successfully replaced with the second base station.

The instructions may further cause the apparatus to identify at least one of a remaining amount of a power source of the first aerial vehicle, whether the first aerial vehicle or the first aerial vehicle system including the first base station operates normally, or a combination thereof.

In the performing of the operation of controlling each of transmit powers of the first and second base stations, the instructions further cause the apparatus to decrease the transmit power of the first base station based on a first function and increase the transmit power of the second base station based on a second function, and the first and second functions may correspond to linear functions or non-linear functions that are configured to derive a constant function when mutually summed.

In the performing of the operation of changing coverages of the first and second cells, the instructions may further cause the apparatus to control each of the first aerial vehicle and the second aerial vehicle to move a position thereof.

In the performing of the operation of changing coverages of the first and second cells, the instructions may further cause the apparatus to control each of the first aerial vehicle and the second aerial vehicle to change a direction in which each of the first aerial vehicle and the second aerial vehicle faces.

In the performing of the operation of changing coverages of the first and second cells, the instructions may further cause the apparatus to control each of the first base station and the second base station to change a direction in which an antenna thereof faces.

The instructions may further cause the apparatus to perform both the operation of controlling each of the transmit powers of the first and second base stations and the operation of changing the coverages of the first and second cells.

According to the exemplary embodiments of the present disclosure, provided are methods ad apparatuses for controlling ABSs, which can maintain or guarantee connectivity of services previously provided to users or terminals, and can improve reliability of a radio access network formed through the ABSs at low cost. According to the exemplary embodiments of the present disclosure, in a process of replacing an ABS providing services in a predetermined communication area with another ABS, transmit powers, vertical/horizontal positions, directions of AVs, and/or directions of antennas of the ABSs can be controlled. Through this, handover of users or terminals receiving the services can be easily and quickly performed.

BRIEF DESCRIPTION OF DRAWINGS

FIGS. 9A and 9B are conceptual diagrams for describing a fourth exemplary embodiment of an ABS replacement method in a communication system.

DETAILED DESCRIPTION OF THE EMBODIMENTS

Figure 1:
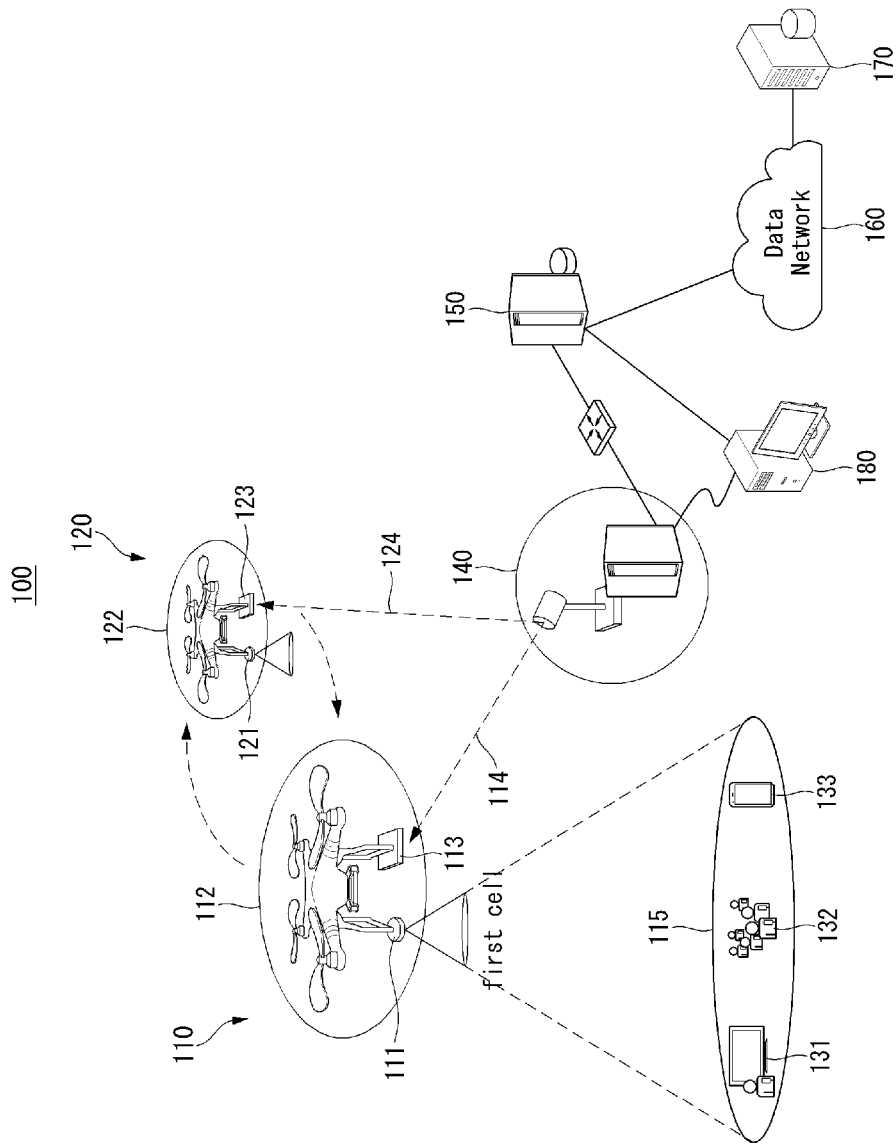
FIG. 1 is a conceptual diagram illustrating an exemplary embodiment of a communication system.

Embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one of A or B" or "at least one of combinations of one or more of A and B". In addition, "one or more of A and B" may refer to "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

A communication system to which exemplary embodiments according to the present disclosure are applied will be described. The communication system to which the exemplary embodiments according to the present disclosure are applied is not limited to the contents described below, and the exemplary embodiments according to the present disclosure may be applied to various communication systems. Here, the communication system may have the same meaning as a communication network.

Hereinafter, preferred exemplary embodiments of the present disclosure will be described in more detail with reference to the accompanying drawings. In describing the present disclosure, in order to facilitate an overall understanding, the same reference numerals are used for the same elements in the drawings, and duplicate descriptions for the same elements are omitted.

FIG. 1 is a conceptual diagram illustrating an exemplary embodiment of a communication system.

Referring to FIG. 1, a communication system 100 may include one or more communication nodes 111, 112, 113, 121, 123, 131, 132, 133, 140, 150, and 180. At least some of the one or more communication nodes 111, 112, 113, 121, 123, 131, 132, 133, 140, 150, and 180 may support 4G communication (e.g., long term evolution (LTE), LTE-Advanced (LTE-A)), 5G communication (e.g., new radio (NR)), or wireless communication after 5G (e.g., 6G communication, etc.) defined by the $3^{rd}$ generation partnership project (3GPP). The 4G communication may be performed in a frequency band of 6 GHz or below, and the 5G communication or wireless communications after the 5G communication may be performed not only in a frequency band of 6 GHz or below but also in a frequency band of 6 GHz or above. Meanwhile, at least some of the one or more communication nodes 111, 112, 113, 121, 123, 131, 132, 133, 140, 150, and 180 may perform mutual communications according to an independent scheme or an independent specification. For example, an exemplary embodiment of the communication system 100 may include a first base station 111, a second base station 121, and/or a core network 150. The first base station 111 and the second base station 121 may support an orthogonal frequency division multiplexing (OFDM)-based 4G communication protocol, 5G communication protocol, and/or evolved communication protocol after the 5G communication. Here, when the communication system 100 supports the 4G communication, the core network 150 may include a serving-gateway (S-GW), a packet data network (PDN)-gateway (P-GW), a mobility management entity (MME), and the like. When the communication system 100 supports the 5G communication, the core network may include a user plane function (UPF), a session management function (SMF), an access and mobility management function (AMF), and the like. Meanwhile, each of the plurality of communication nodes 111, 112, 113, 121, 123, 131, 132, 133, 140, 150, and 180 constituting the communication system 100 may have the following structure.

Figure 2:
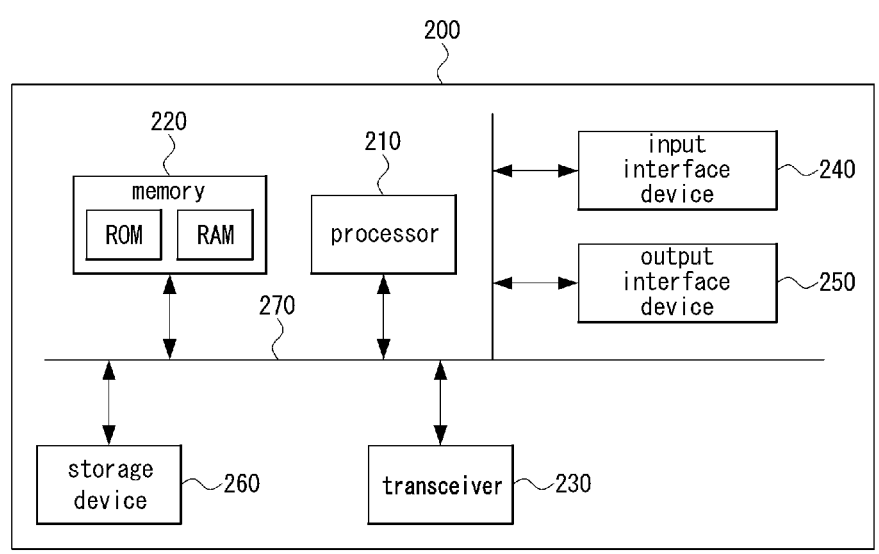
FIG. 2 is a block diagram illustrating an exemplary embodiment of a communication node constituting a communication system.

FIG. 2 is a block diagram illustrating an exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise one or more base stations 111 and 121, and one or more users or terminals 131, 132, and 133. A network formed by the one or more base stations 111 and 121, and the one or more users or terminals 131, 132, and 133 may be referred to as an 'access network'. The one or more base stations 111 and 121 and the one or more users or terminals 131, 132, and 133 that are interconnected by wireless communication may be viewed as forming a 'radio access network'. Meanwhile, each of the one or more users or terminals 131, 132, and 133 may be referred to as a user equipment (UE), terminal, access terminal, mobile terminal, station, and subscriber station, mobile station, portable subscriber station, node, device, Internet of Things (IoT) device, mounted device (e.g., mounted module/device/terminal or on-board device/terminal, etc.), or the like.

Each of the one or more base stations 111 and 121 may operate in a different frequency band, or may operate in the same frequency band. The one or more base stations 111 and 121 may be connected to each other through an ideal backhaul link or non-ideal backhaul link. The one or more base stations 111 and 121 may exchange information with each other through the ideal backhaul link or non-ideal backhaul link. Each of the one or more base stations 111 and 121 may be directly or indirectly connected to the core network 150 through an ideal backhaul link or non-ideal backhaul link. Each of the one or more base stations 111 and 121 may transmit signals received from the core network 150 to the one or more users or terminals 131, 132, and 133, and transmit signals received from the one or more users or terminals 131, 132, and 133 to the core network 150.

In an exemplary embodiment of the communication system 100, at least some of the one or more base stations 111 and 121 may correspond to an aerial base station (ABS) mounted on an aerial vehicle (AV) 112 or 122. Here, a system configured with at least one aerial base station and at least one aerial vehicle may be referred to as an 'aerial vehicle system (AVS)' 110 or 120. Each of the AVSs 110 and 120 may include one or more mobile backhaul terminals (MBTs) 113 and 123 so that the aerial base stations 111 and 121 can be connected to another base station, a hub, or a core network. The one or more MBTs 113 and 123 may be mounted on the one or more aerial vehicles 112 and 122. The one or more MBTs 113 and 123 may be connected to a terrestrial base station, a hub, or a core network. For example, the one or more MBTs 113 and 123 may be connected to one or more mobile backhaul hubs (MBHs) connected to a core network 150 on the ground in a wired or wireless communication scheme. The one or more MBTs 113 and 123 may be connected to the one or more MBHs in a wired or wireless communication scheme. Links between the one or more MBTs 113 and 123 and the one or more MBHs may be referred to as 'backhaul links'. An exemplary embodiment of the communication system 100 may include a first hub 140 corresponding to an MBH. The one or more MBTs 113 and 123 may be connected to the first hub 140, thereby being connected to the core network 150 connected to the first hub 140.

In each AVS, the aerial vehicle on which the aerial base station is mounted may mean a device capable of moving or flying using a predetermined power in the air. For example, the aerial vehicle may correspond to a drone, an aerial airship, an air balloon, or the like. The aerial base station mounted on the aerial vehicle may move to a specific position in the air. The aerial base station may be mounted on the aerial vehicle to form a cell coverage at the specific position in the air, and may communicate with users or terminals within the cell coverage. In the AVS, the aerial vehicle may perform a flight function, and a communication function may be performed through the aerial base station. Hereinafter, an exemplary embodiment of the communication system will be described by taking as an example a situation in which two aerial base stations are included in the communication system as shown in FIG. 1. However, exemplary embodiments of the present disclosure are not limited thereto, and the present disclosure may be applied to various exemplary embodiments. For example, the communication system may be configured to include one ABS, or three or more ABS s.

The communication system 100 may include aerial base stations such as the first base station 111 and the second base station 121. Each of the first base station 111 and the second base station 121 may be mounted on an aerial vehicle such as the first aerial vehicle 112 and the second aerial vehicle 122. The first aerial vehicle 112 and the second aerial vehicle 122 may be equipped with the first base station 111 and the second base station 121, respectively, and may move in the air or may perform hovering in a specific position in the air. Each of the first base station 111 and the second base station 121 may form a cell coverage in the air to perform wireless communication with one or more users or terminals within the formed cell coverage. For example, the first base station 111 may be mounted on the first aerial vehicle 112 to form a first cell 115 at a specific position in the air. The first base station 111 may communicate with one or more users or terminals 131, 132, and 133 located within the coverage of the first cell 115.

The first base station 111 and the first aerial vehicle 112 may constitute the first AVS 110. The first AVS 110 may be referred to as the 'first vehicle system' 110. The second base station 121 and the second aerial vehicle 122 may constitute the second AVS 120. The second AVS 120 may be referred to as the 'second vehicle system' 120.

Each of the first vehicle system 110 and the second vehicle system 120 may include one or more MBTs to connect the first base station 111 and the second base station 121 to a terrestrial base station, hub, or core network, respectively. For example, the first vehicle system 110 may include the first MBT 113 mounted on the first aerial vehicle 112. The second vehicle system 120 may include the second MBT 123 mounted on the second aerial vehicle 122.

The first base station 111 and the second base station 121 may be connected to the first hub 140 on the ground through the first MBT 113 and the second MBT 123, respectively. The first base station 111 and the second base station 121 may be connected to the core network 150 and the like through the first MBT 113, the second MBT 123, and the first hub 140. For example, the first base station 111 and the second base station 121 may be connected to the core network 150 on the ground through connection with the first MBT 113, the second MBT 123, and the first hub 140. The first MBT 113 and the second MBT 123 may be connected to the first hub 140 connected to the core network 150 on the ground in a wired or wireless communication scheme. The first hub 140 may correspond to, for example, an MBH. The communication link between the first MBT 113 or the second MBT 123 and the first hub 140 may be referred to as a first backhaul link 114 and a second backhaul link 124, respectively. The first base station 111 and the second base station 121 may be connected to the first hub 140 through the first MBT 113 and the second MBT 123, respectively. The first base station 111 and the second base station 121 may be connected to the core network 150 through the first hub 140, respectively. Each of the first base station 111 and the second base station 121 may be connected to a data network 160 and/or one or more application servers 170 through the core network 150.

Meanwhile, the communication system 100 may include a first control apparatus 180 for controlling the first base station 111, the first aerial vehicle 112, the first MBT 113, the second base station 121, the second aerial vehicle 122, the second MBT 123, the first hub 140, and/or the core network 150. The first control apparatus 180 may be connected to the components of the first vehicle system 110 and/or the second vehicle system 120 through the first hub 140. For example, the first control apparatus 180 may be connected to the first base station 111, the first aerial vehicle 112, the first MBT 113, the second base station 121, the second aerial vehicle 122, and/or the second MBT 123 through the first hub 140. The first control apparatus 180 may control operations of the first base station 111, the first aerial vehicle 112, the first MBT 113, the second base station 121, the second aerial vehicle 122 and/or the second MBT 123 through the first hub 140. Alternatively, the first control apparatus 180 may be connected to the first aerial vehicle system 110 and the second aerial vehicle system 120 through the first hub 140 to control the respective components.

The first control apparatus 180 may control the operations of the first and second AVSs 110 and 120 connected through the first hub 140 and components thereof. For example, the first control apparatus 180 may control wireless communication parameters such as wireless transmit powers of the first base station 111 and the second base station 121. In addition, the first control apparatus 180 may adjust antenna directions of the first base station 111 and the second base station 121. Meanwhile, the first control apparatus 180 may physically control the first aerial vehicle 112 and the second aerial vehicle 122. For example, the first control apparatus 180 may perform operations such as moving the positions of the first aerial vehicle 112 and the second aerial vehicle 122 or rotating the directions thereof. The first control apparatus 180 may adjust the antenna directions of the first base station 111 and the second base station 121, and the positions and/or directions of the first aerial vehicle 112 and the second aerial vehicle 122. In other words, the first control apparatus 180 may physically control the components of the first and second AVSs 110 and 120. The first control apparatus 180 may physically control the components of the first AVS 110 and the second AVS 120 to adjust the directions and positions on the ground, etc. of the first cell 115 and the second cell.

The aerial base stations such as the first base station 111 and the second base station 121 which are mounted on the aerial vehicles may have the advantage of being able to form cell coverages in a disaster situation or a place where the existing communication infrastructure is not constructed, and provide services to users or terminals. In addition, since the aerial base station transmits and receives radio signals in the air, it may have an advantage that it is less likely to experience a communication failure due to obstacles on a communication path compared to a base station installed on the ground. Meanwhile, the ABS may have restrictions on a flight time due to limitations such as fuel or battery for providing power. Accordingly, in order to continuously provide a radio access network in a specific area through the ABS, it may be necessary to replace (or switch) the ABS whose fuel or battery is exhausted with another ABS.

For example, in order to provide services in a predetermined communication area, the first base station 111 may be mounted on the first AV 112 and fly in the air to form the first cell 115. The first base station 111 may provide services to one or more users or terminals 131, 132, and 133 located within the coverage of the first cell 115. While the first base station 111 provides services in the air, the first AV 112 may consume its fuel or battery. Due to the limitation of the total amount of fuel or battery of the first AV 112, the first base station 111 may not be able to indefinitely provide services in one communication area. For example, when the remaining amount of fuel or battery is reduced to less than a preset threshold, the first base station 111 may need to leave the communication area in which the services are being provided. Alternatively, when a problem such as a mechanical or electronic defect occurs in some or all of the components (e.g., the first base station 111, the first AV 112, the first MBT 113, etc.) constituting the first AVS 110, the first base station 111 may not be able to provide the services normally/continuously. In order to solve the problem that has occurred, the first AVS 110 may need to leave the communication area in which the services are being provided. When the first base station 111 leaves the communication area in which the services are being provided, the services provided through the first cell 115 may be terminated. Alternatively, the first base station 111 may return to the corresponding communication area again when the problem such as the battery or fuel shortage problem, or the mechanical or electronic defect that has occurred is resolved, and may provide services to the one or more users or terminals 131, 132, and 133. The operations of the first base station 111 and/or the first AVS 110 disclosed in this paragraph may be determined and controlled by the first AVS 110 by itself. Alternatively, the operations of the first base station 111 and/or the first AVS 110 disclosed in this paragraph may be determined and controlled by the first control apparatus 180 connected through the first hub 140.

Meanwhile, when the first base station 111 temporarily or eventually leaves the communication area in which the services are being provided, the one or more users or terminals 131, 132, and 133 receiving the services may require a new base station to provide services. In this case, the first control apparatus 180 may move the second base station 121 to the corresponding communication area in order to replace the first base station 111. The second base station 121 may provide services by forming a cell in the communication area in which the first base station 111 provided the services. Here, a frequency and/or an identifier (ID) of the cell formed by the second base station 121 may be the same as or different from a frequency and/or an ID of the first cell 115 formed by the first base station. The one or more users or terminals 131, 132, and 133 that have been provided with the services through the first base station 111 may be provided with the services by being handed over to the second base station 121 deployed to replace the first base station 111. When all of the one or more users or terminals 131, 132, and 133 to which the first base station 111 is providing the services are handed over to the second base station 121, the first base station 111 may leave the corresponding area. Accordingly, the first base station 111 may be replaced with the second base station 121.

Here, in replacing one ABS providing services in a corresponding area with another ABS, techniques for continuously providing services being provided without interruption may be required. In other words, in performing the switching between ABSs, techniques for maintaining or guaranteeing connectivity of the services being provided may be required.

Figure 3:
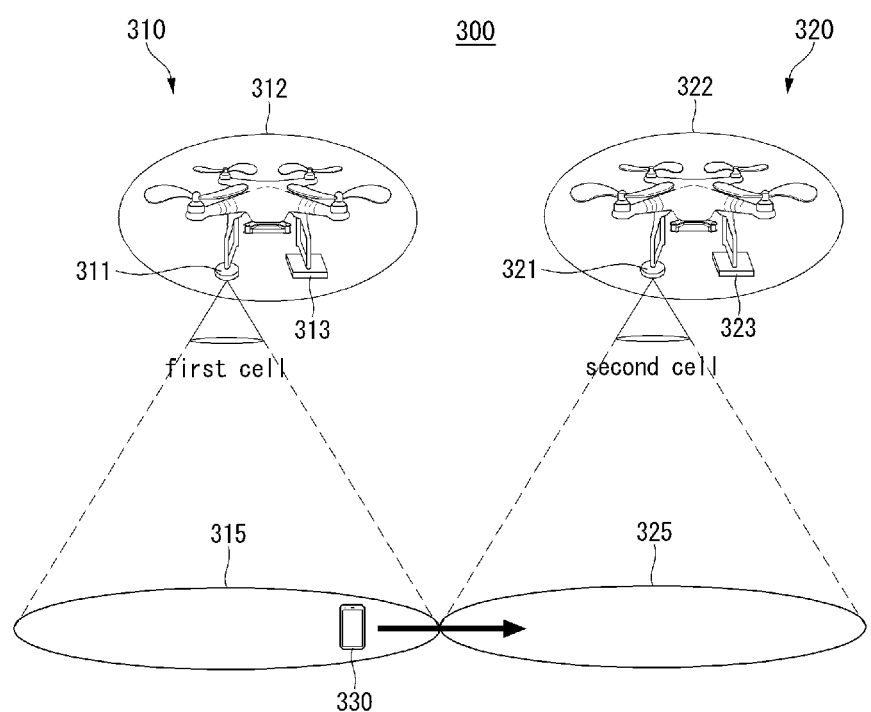
FIG. 3 is a conceptual diagram for describing an exemplary embodiment of a method for handover between ABSs in a communication system.

FIG. 3 is a conceptual diagram for describing an exemplary embodiment of a method for handover between ABSs in a communication system.

Referring to FIG. 3, a communication system 300 may include a first AVS 310, a second AVS 320, a first communication node 330, and the like. The first AVS 310 may include a first base station 311, a first AV 312, a first MBT 313, and the like. The second AVS 320 may include a second base station 321, a second AV 322, a second MBT 323, and the like.

Here, the first AVS 310 and the second AVS 320 may be configured identically or similarly to the first AVS 110 and the second AVS 120 described with reference to FIG. 1. For example, each of the first AVS 310 and the second AVS 320 may correspond to an aerial vehicle system. The first base station 311 and the second base station 321 may be configured identically or similarly to the first base station 111 and the second base station 121 described with reference to FIG. 1. The first base station 311 and the second base station 321 may correspond to ABSs. The first communication node 330 may be configured identically or similarly to the one or more users or terminals 131, 132, and 133 described with reference to FIG. 1. Some or all of the first base station 311, the second base station 321, and the first communication node 330 may be configured identically or similarly to the communication node 200 described with reference to FIG. 2. Hereinafter, in describing an exemplary embodiment of a method for handover between ABSs with reference to FIG. 3, content overlapping with those described with reference to FIGS. 1 and 2 may be omitted.

The first base station 311 of the first AVS 310 may be connected to a first hub (not shown) and/or a core network (not shown) on the ground through the first MBT 313 in the air. The first base station 311 may transmit radio signals or beam(s) in the air to form a first cell 315 in a predetermined communication area. The first base station 311 may be connected to the first communication node 330 within a coverage of the first cell 315 to provide services. The first communication node 330 may be connected to the core network (not shown) through the first base station 311 to receive services. On the other hand, the second base station 321 of the second AVS 320 may be connected to the first hub (not shown) and/or the core network (not shown) on the ground through the second MBT 323 in the air. The second base station 321 may transmit radio signals or beam(s) to form a second cell 325 in a predetermined communication area. The frequencies and/or IDs of the first cell 315 and the second cell 325 may be configured identically or differently. The coverage of the first cell 315 and the coverage of the second cell 325 may partially or fully overlap, or may not overlap. The first AVS 310 and the second AVS 320 may be connected to a first control apparatus (not shown) through the first hub (not shown). The first control apparatus (not shown) may control operations of the first and second AVSs 310 and 320 and components thereof. The first control apparatus (not shown) may be configured identically or similarly to the first control apparatus 180 described with reference to FIG. 1.

The first communication node 330 may have mobility. For example, the first communication node 330 may correspond to a user equipment (UE) carried by a moving user. Alternatively, the first communication node 330 may correspond to a communication node such as a vehicle-to-everything (V2X) terminal mounted on a moving means such as a vehicle. As the first communication node 330 moves, it may go out of the coverage of the first cell 315. Alternatively, as the first communication node 330 moves, a strength of signals received from the first cell 315 may decrease. When the first communication node 330 leaves the coverage of the first cell 315 during movement or the strength of signals received from the first cell 315 decreases below a predetermined reference value, an operation for handover to another cell may be performed. For example, the first communication node 330 may attempt to search for a target cell for handover from the first cell 315 corresponding to a serving cell. The first communication node 330 may recognize the second cell 325 as a target cell. The first communication node 330 may determine whether to handover based on strengths, qualities, or a change pattern of signals received from the first cell 315 and the second cell 325. When handover to the second cell is determined, the first communication node 330 may terminate communication with the first cell 315 and perform handover to the second cell 325.

Meanwhile, even if the first communication node 330 does not move, the handover of the first communication node 330 may be induced or triggered due to the mobility of the first AVS 310 and/or the second AVS 320. For example, when the first AVS 310 and/or the second AVS 320 moves, the coverages of the first cell 315 and/or the second cell 325 may also move. Due to the movement of the first AVS 310 and/or the second AVS 320, the first communication node 330 may go out of the coverage of the first cell 315 corresponding to the serving cell. Alternatively, due to the movement and/or transmit power adjustments of the first AVS 310 and/or the second AVS 320, the strength or quality of signals of the first cell 315 at the first communication node 330 may be reduced below a predetermined reference value. Alternatively, due to the movement and/or transmit power adjustments of the first AVS 310 and/or the second AVS 320, the strength or quality of signals of the second cell 325 at the first communication node 330 may become more excellent than that of the first cell 315. The first communication node 330 may determine whether to handover from the first cell 315 to the second cell 325 based on the strengths, qualities, or a change pattern thereof of the first cell 315 and the second cell 325.

The first control apparatus (not shown) may be connected to the first AVS 310, the second AVS 320, and/or components thereof to perform control operations. For example, the first control apparatus (not shown) may control transmit powers of the first cell 315 and the second cell 325. Alternatively, the first control apparatus (not shown) may physically control the first AVS 310 and the second AVS 320 to control their directions and/or positions on the ground.

The first control apparatus (not shown) may induce or trigger a handover of the first communication node 330 through the controls on the first AVS 310 and the second AVS 320. When it is determined to be necessary to replace the first AVS 310 providing services to the first communication node 330 with the second AVS 320, the first control apparatus (not shown) may induce or trigger the handover of the first communication node 330 by controlling the first AVS 310 and the second AVS 320. Accordingly, the first control apparatus (not shown) may perform a replacement (i.e., switching) procedure for the AVSs or the ABSs.

Figure 4:
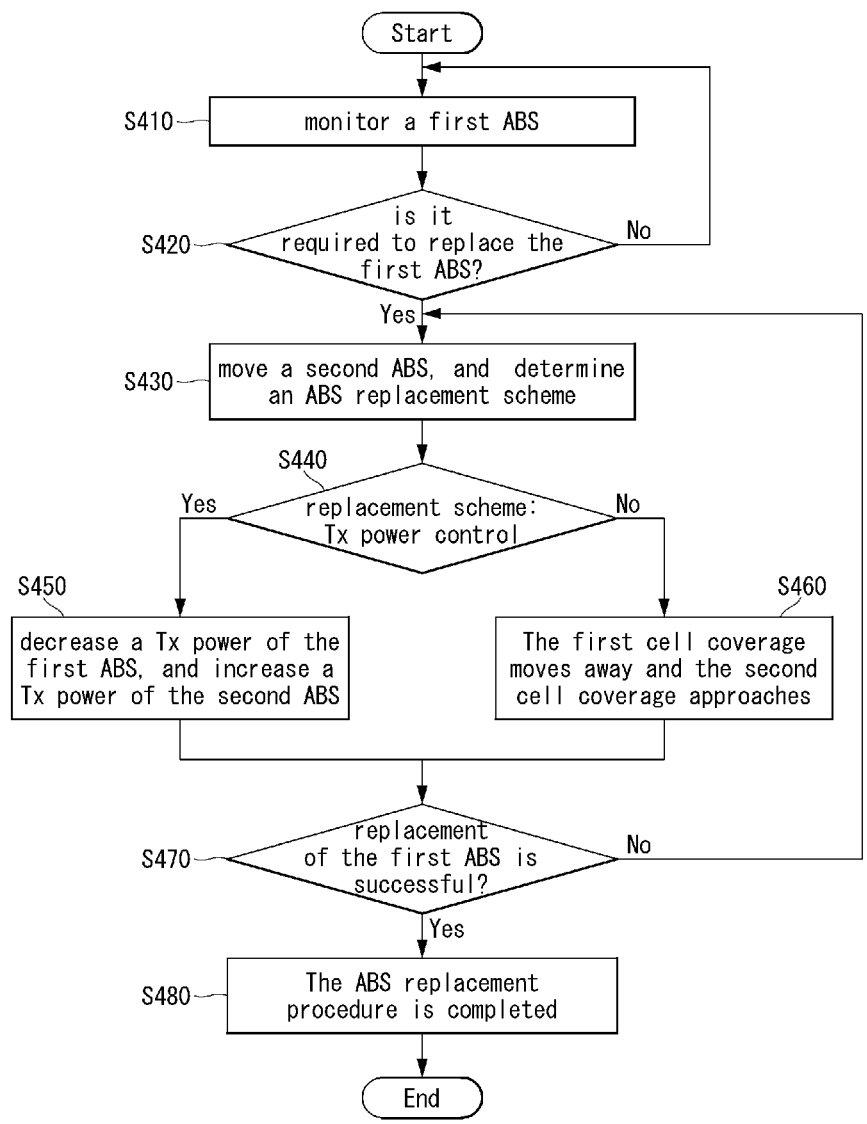
FIG. 4 is a conceptual diagram for describing an exemplary embodiment of a method for controlling ABSs in a communication system.

FIG. 4 is a conceptual diagram for describing an exemplary embodiment of a method for controlling ABSs in a communication system.

Referring to FIG. 4, a communication system may include one or more AVSs and/or a first control apparatus controlling the one or more AVSs. The communication system may include one or more ABSs included in each of the one or more AVSs, and/or one or more first communication nodes connected to the one or more ABSs to receive services. Here, the one or more AVSs and components thereof may be configure identically or similarly to the first AVS 110 and the second AVS 120 described with reference to FIG. 1, the first AVS 310 and the second AVS 320, and the components thereof described with reference to FIG. 3. The one or more ABSs may be configured identically or similarly to the first base station 111 and the second base station 121 described with reference to FIG. 1, and the first base station 311 and the second base station 321 described with reference to FIG. 3. Each of the first base station and the second base station may correspond to an ABS. The one or more first communication nodes may be configured identically or similarly to the one or more users or terminals 131, 132, and 133 described with reference to FIG. 1 and the first communication node 330 described with reference to FIG. 3. Some or all of the one or more ABSs, the one or more first communication nodes, and the first control apparatus may be configured identically or similarly to the communication node 200 described with reference to FIG. 2. Hereinafter, in describing an exemplary embodiment of a method for controlling ABSs with reference to FIG. 4, content overlapping with those described with reference to FIGS. 1 to 3 may be omitted.

The first control apparatus may be connected to the first base station providing services to one or more first communication nodes in a predetermined communication area through a first hub. The first control apparatus may monitor the first base station and/or the first AVS including the first base station (S410). Here, the first base station may correspond to an ABS. The first AVS may correspond to an aerial vehicle system. The first control apparatus may monitor a remaining amount of fuel or battery for supplying power to the first AV on which the first base station is mounted. Alternatively, the first control apparatus may monitor whether each component of the first AVS operates normally.

The first control apparatus may determine whether replacement of the first base station is required based on a result of the monitoring (S420). For example, the first control apparatus may compare a remaining amount of fuel or battery for supplying power to the first AV with a preset first threshold. Here, the first threshold may be set to a value that a person skilled in the art determines is appropriate to determine whether to replace the first base station. For example, the first threshold may be set based on the amount of fuel or battery required for the first base station to move to a place to replenish fuel or battery. Alternatively, the first threshold may be set as a ratio to the maximum amount of fuel or battery. When it is determined that the remaining amount of fuel or battery of the first AV is less than the first threshold, the first control apparatus may determine that replacement of the first base station is required. Meanwhile, the first control apparatus may determine whether replacement of the first base station is required according to whether each component of the first AVS operates normally. For example, when it is determined that some or all of the components of the first AVS operate abnormally or are expected to operate abnormally, it may be determined that replacement of the first base station is required.

If the necessity for replacement of the first base station is not identified (S420), the first control apparatus may perform the monitoring according to step S410 again. On the other hand, when the necessity of replacement of the first base station is identified (S420), the first control apparatus may perform operations for replacing the first base station with the second base station. Here, the second base station may correspond to an ABS. The second base station may be mounted on a second AV corresponding to an aerial vehicle. The second base station and the second AV may be included in the second AVS corresponding to an aerial vehicle system.

The first control apparatus may move the second base station in the direction of the predetermined communication area in which the first base station provides services (S430). Also, the first control apparatus may determine a scheme of replacing the first base station with the second base station (S430). For example, the first control apparatus may determine to replace the first base station with the second base station based on the same or similar scheme as described with reference to FIG. 3. Specifically, the first control apparatus may determine to replace the first base station with the second base station by controlling the transmit powers of the first and second base stations (i.e., transmit power control scheme) or by physically controlling the first and second AVSs (i.e., physical control scheme). For convenience of description, an exemplary embodiment in which one of the transmit power control scheme and the physical control scheme is selectively applied is shown in FIG. 4, but exemplary embodiments of the present disclosure are not limited thereto. For example, when replacing the first base station with the second base station, the first control apparatus may simultaneously apply both the transmit power control scheme and the physical control scheme. Alternatively, the first control apparatus may attempt to perform the base station replacement by applying a scheme other than the transmit power control scheme and the physical control scheme.

When the scheme of replacing the first base station with the second base station is determined as the transmit power control scheme (S440), the first control apparatus may decrease the transmit power of the first base station and increase the transmit power of the second base station in a situation in which the cell coverages of the first base station and the second base station overlap fully or partially (S450). In this case, the one or more first communication nodes that have been provided with services through the first base station may perform handover from the first cell to the second cell by comparing a strength, quality, etc. of signals of the first cell formed by the first base station with a strength, quality, etc. of signals of the second cell formed by the second base station. The base station replacement method according to the transmit power control scheme will be described in more detail with reference to FIG. 5.

On the other hand, when the scheme of replacing the first base station with the second base station is determined as the physical control scheme (S440), the first control apparatus may change the coverages of the first and second cells formed by the first and second base stations through physical controls on the first and second AVSs. For example, the first control apparatus may control the directions of antennas of the first and second base stations, the positions and/or directions of the first and second AVSs, and/or the like, so that the coverage of the first cell is gradually departed from the communication area in which the first cell provides services, and the coverage of the second cell approaches the communication area. The one or more first communication nodes may be moved from the first base station to the second base station as the coverage of each of the first and second cells moves. The base station replacement method according to the physical control scheme for the AVSs will be described in more detail with reference to FIGS. 7 to 9.

Alternatively, in a situation in which the cell coverages of the first base station and the second base station overlap fully or partially, the first control apparatus may perform one or more of the control operations according to steps S450 and S460 together or in combination. For example, the first control apparatus may decrease the transmit power of the first base station and increase the transmit power of the second base station (S450), and at the same time, may control the directions of the antennas of the first and second base stations, and the positions and/or directions of the first and second AVSs, etc. to cause a departure of the first cell coverage and an approach of the second cell coverage (S460). In this case, the one or more first communication nodes that have been provided with the services through the first base station may be handed over from the first base station to the second base station due to the decrease in the transmit power of the first base station or the departure and/or the first cell coverage and the increase in the transmit power of the second base station and/or the approach of the second cell coverage.

The first control apparatus may identify whether or not all of the one or more first communication nodes receiving the services from the first base station have handed over to the second base station (S470). If it is determined that some or all of the one or more first communication nodes that have been provided with the services from the first base station have not been handed over to the second base station (S470), the first control apparatus may perform the base station replacement procedure according to some or all of steps S430 to S470 again or continuously. On the other hand, if the one or more first communication nodes receiving the services from the first base station have all handed over to the second base station, the first control apparatus may determine that the base station replacement has been successfully completed (S470) and terminate the base station replacement procedure (S480).

Figure 5:
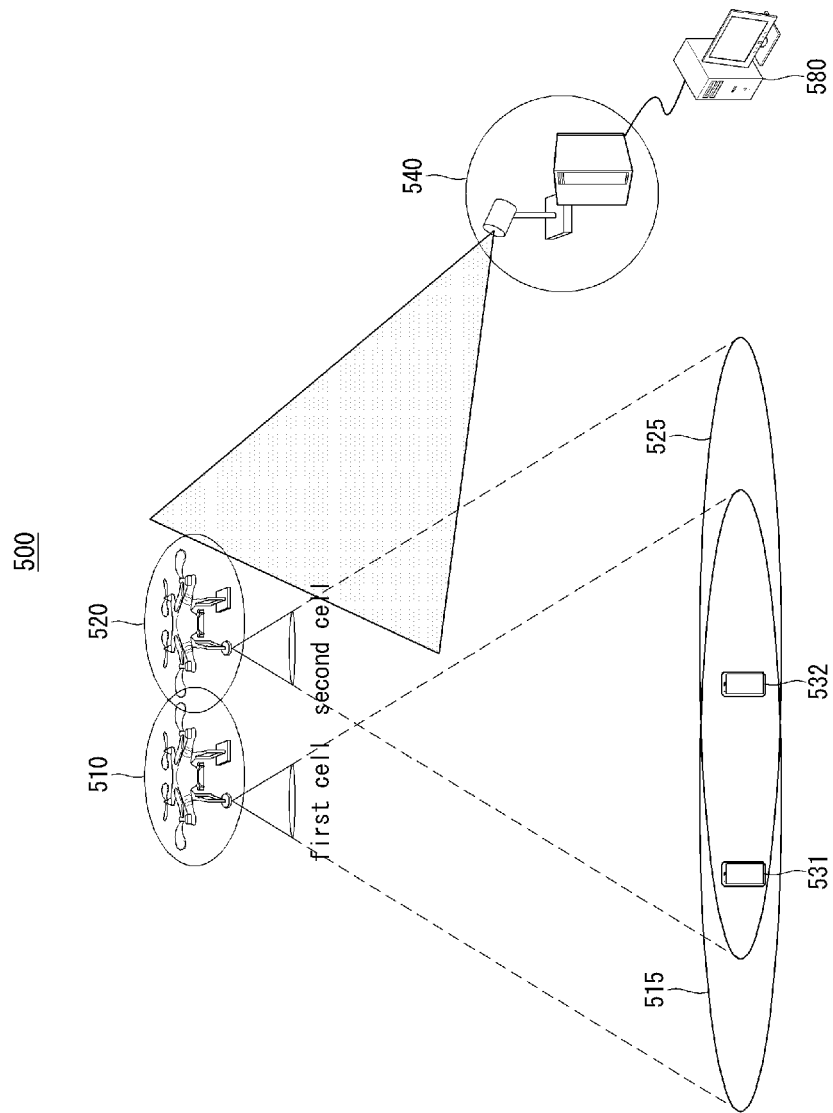
FIG. 5 is a conceptual diagram for describing a first exemplary embodiment of an ABS replacement method in a communication system.

FIG. 5 is a conceptual diagram for describing a first exemplary embodiment of an ABS replacement method in a communication system.

Referring to FIG. 5, a communication system 500 may include a first AVS 510, a second AVS 520, a first control apparatus 580, and the like. The communication system 500 may include a first base station and a second base station respectively included in the first AVS 510 and the second mobile AVS 520, and one or more first communication nodes 531 and 532 connected to the first base station to receive services. The communication system 500 may further include a first hub 540 that connects the first AVS 510 and the second AVS 520 with the first control apparatus 580 and/or a core network (not shown).

Here, the first AVS 510, the second AVS 520, and components thereof may be configured identically or similarly to the first AVS 110 and the second AVS 120 described with reference to FIG. 1, the first AVS 310 and the second AVS 320 described with reference to FIG. 3, the first AVS, the second AVS, and the components thereof described with reference to FIG. 4. The first base station and the second base station may be configured identically or similarly to the first base station 111 and the second base station 121 described with reference to FIG. 1, the first base station 311 and the second base station 321 described with reference to FIG. 3, and the first base station and the second base station described with reference to FIG. 4. The first base station and the second base station may correspond to ABSs. The one or more first communication nodes 531 and 532 may be configured identically or similarly to the one or more users or terminals 131, 132, and 133 described with reference to FIG. 1, the first communication node 330 described with reference to FIG. 3, and the first communication node described with reference to FIG. 4. The first hub 540 may be configured identically or similarly to the first hub 140 described with reference to FIG. 1, the first hub described with reference to FIG. 3, and the first hub described with reference to FIG. 4. Some or all of the first base station, the second base station, one or more first communication nodes 531 and 532, the first hub 540, and the first control apparatus 580 may be configured identically or similarly to the communication node 200 described with reference to FIG. 2. Hereinafter, in describing a first exemplary embodiment of a method for replacing an ABS with reference to FIG. 5, content overlapping with those described with reference to FIGS. 1 to 4 may be omitted.

The first control apparatus 580 may perform the base station replacement operation by controlling the transmit powers of the first and second base stations. For example, the first control apparatus may determine to replace the first base station, which is included in the first AVS 510 to form the first cell 515 and provide services to the one or more first communication nodes 531 and 532, with the second base station included in the second AVS 520. The first control apparatus 580 may move the second base station in the direction of the first base station in order to perform the base station replacement. As the second base station moves in the direction of the first base station, the coverages of the first cell 515 and the second cell 525 formed by the first base station and the second base station may overlap fully or partially.

The first control apparatus 580 may decrease the transmit power of the first base station and increase the transmit power of the second base station in the situation in which the coverages of the first cell 515 and the second cell 525 overlap fully or partially. For example, the first control apparatus 580 may control the transmit powers of the first and second base stations in the same or similar manner as shown in FIGS. 6A to 6D.

FIGS. 6A to 6D are graphs for describing the first exemplary embodiment of the ABS replacement method in a communication system.

Referring to FIGS. 6A to 6D, the first control apparatus included in the communication system may perform the ABS replacement operation by control the transmit powers of the first base station and the second base station. Here, the first control apparatus may be configured identically or similarly to the first control apparatus 580 described with reference to FIG. 5, and the first base station and the second base station may be configured identically or similarly to the first base station and the second base station described with reference to FIG. 5. The first base station and the second base station may correspond to ABSs.

Figure 6A:
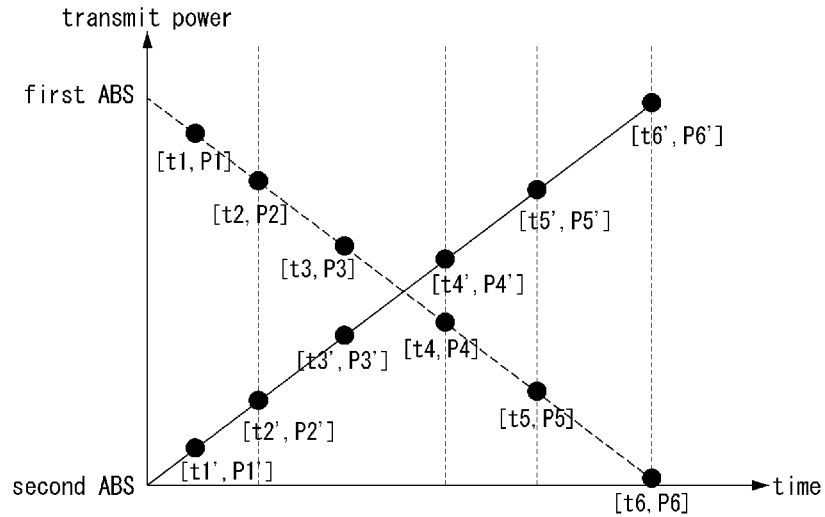
FIGS. 6A to 6D are graphs for describing the first exemplary embodiment of the ABS replacement method in a communication system.
Figure 6B:
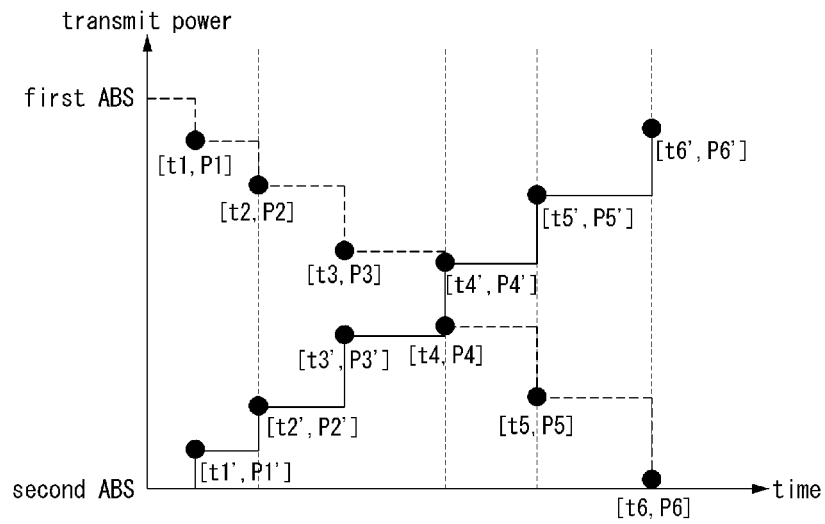

Referring to FIGS. 6A and 6B, the first control apparatus may gradually decrease the transmit power of the first base station based on a linear function, and simultaneously increase the transmit power of the second base station to the same or similar degree. For example, the transmit power of the first base station may decrease based on a first linear function, and the transmit power of the second base station may increase based on a second linear function.

As shown in FIG. 6A, the first control apparatus may control the transmit powers of the first and second base stations to have continuous or indiscrete values between function values p1, p2, p3, p4, p5, and p6 of a plurality of points t1, t2, t3, t4, t5, and t6 in the time domain on the first and second linear functions. On the other hand, as shown in FIG. 6B, the first control apparatus may control the transmit powers of the first and second base stations to have non-continuous or discrete values only at the plurality of points t1, t2, t3, t4, t5, and t6 in the time domain on the first and second linear function. Here, the first and second linear functions may be configured so that their sum is a constant function having a constant value.

Figure 6C:
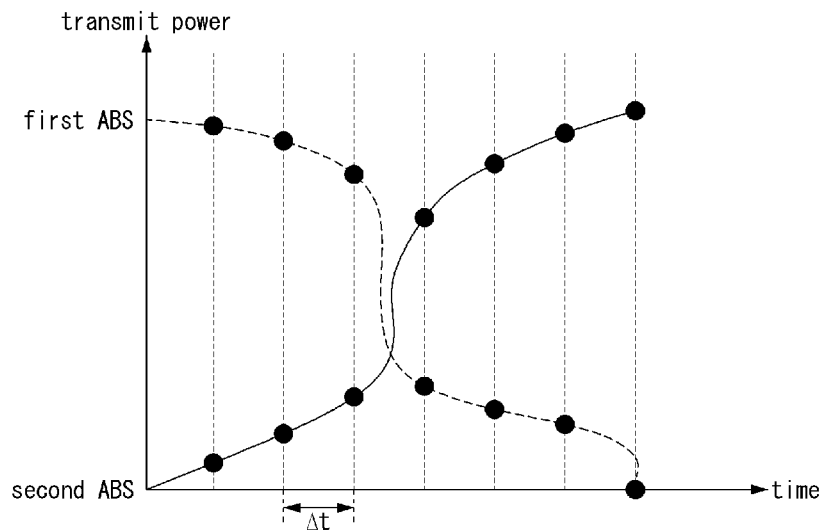
Figure 6D:
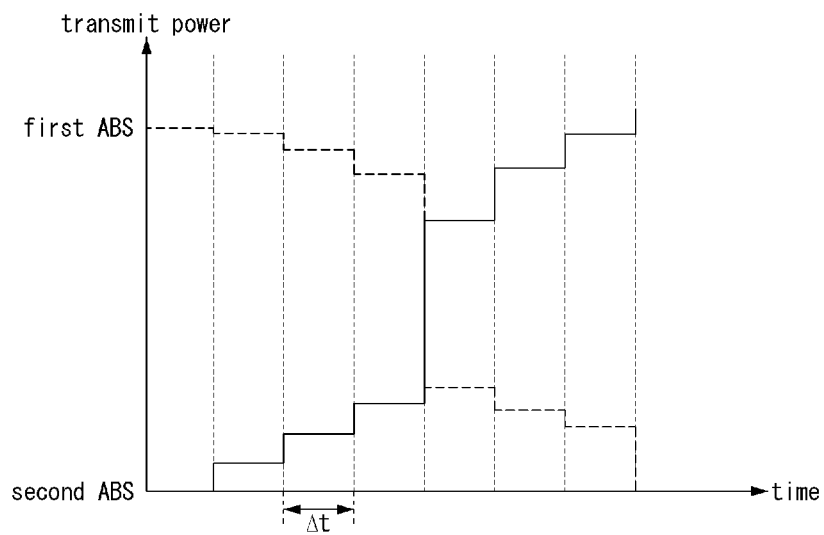

Referring to FIGS. 6C and 6D, the first control apparatus may gradually decrease the transmit power of the first base station based on a non-linear function and simultaneously increase the transmit power of the second base station to the same or similar degree. For example, the transmit power of the first base station may decrease based on a first non-linear function, and the transmit power of the second base station may increase based on a second non-linear function.

As shown in FIG. 6C, the first control apparatus may control the transmit powers of the first and second base stations have continuous or indiscrete values between a plurality of points having a predetermined time interval of Δt (or between their function values) in the time domain on the first and second nonlinear functions. On the other hand, as shown in FIG. 6D, the first control apparatus may control the transmit powers of the first and second base stations have non-continuous or discrete values only at the plurality of points having the predetermined time interval of Δt in the time domain on the first and second nonlinear functions. Here, the first and second linear functions may be configured so that their sum is a constant function having a constant value.

Referring again to FIG. 5, the first control apparatus 580 may control the first and second base stations so that the transmit power of the first base station decreases and the transmit power of the second base station increases. As the transmit power of the first base station decreases and the transmit power of the second base station increases, a signal of the second cell 525, which is received at the one or more first communication node 531 and 532, may be gradually improved than a signal of the first cell 515, which is received at the one or more first communication node 531 and 532. When a strength, quality, etc. of the signal of the first cell 515 is lowered below a preset first strength reference, when a strength, quality, etc. of the second cell 525 is higher than a preset second strength reference, or when the signal of the second cell 525 becomes better than the signal of the first cell 515, the one or more first communication nodes 531 and 532 may perform handover to the second cell 525 or the second base station. When it is confirmed that all of the one or more first communication nodes 531 and 532 have handed over to the second base station, it may be determined that the base station replacement procedure has been successfully completed.

Figure 7A:
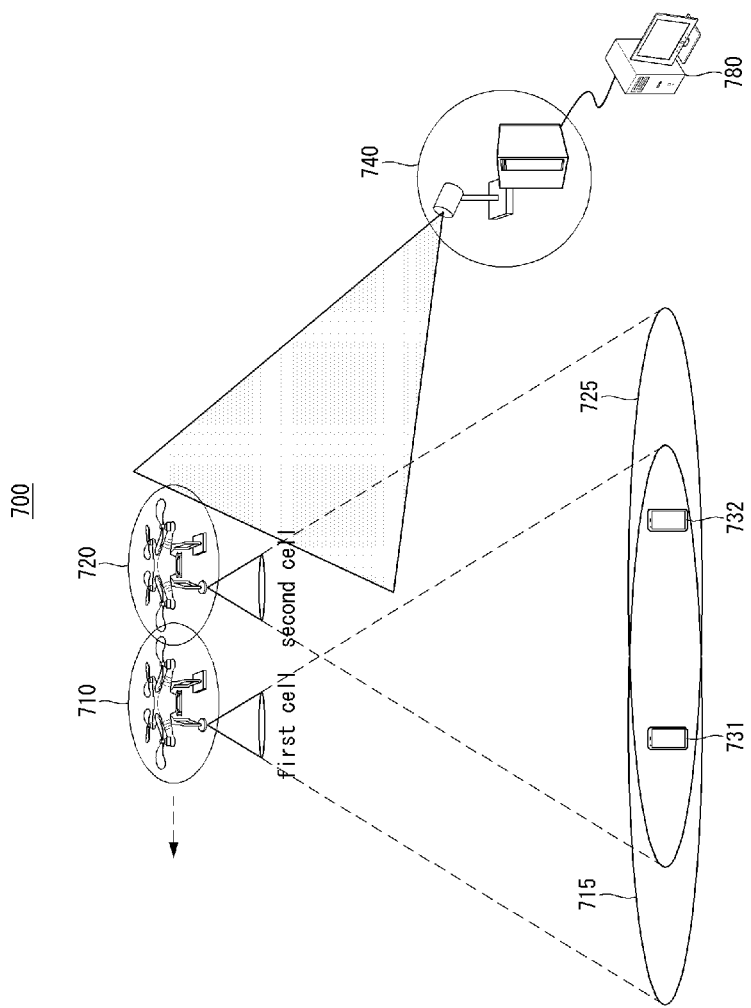
FIGS. 7A and 7B are conceptual diagrams for describing a second exemplary embodiment of an ABS replacement method in a communication system.
Figure 7B:
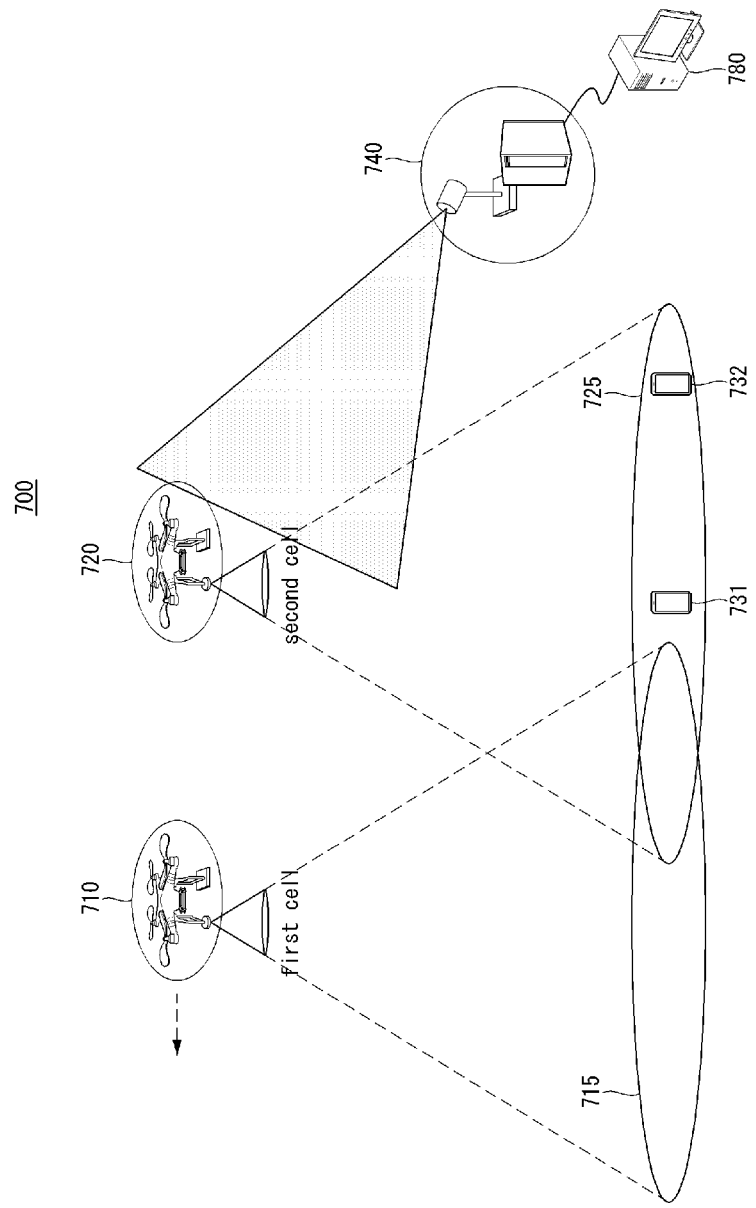

FIGS. 7A and 7B are conceptual diagrams for describing a second exemplary embodiment of an ABS replacement method in a communication system.

Referring to FIGS. 7A and 7B, a communication system 700 may include a first AVS 710, a second AVS 720, a first control apparatus 780, and the like. The communication system 700 may include a first base station and a second base station respectively included in the first AVS 710 and the second mobile AVS 720, and one or more first communication nodes 731 and 732 connected to the first base station to receive services. The communication system 700 may further include a first hub 740 that connects the first AVS 710 and the second AVS 720 with the first control apparatus 780 and/or a core network (not shown).

Here, the first AVS 710, the second AVS 720, and components thereof may be configured identically or similarly to the first AVS 110 and the second AVS 120 described with reference to FIG. 1, the first AVS 310 and the second AVS 320 described with reference to FIG. 3, the first AVS, the second AVS, and the components thereof described with reference to FIG. 4. The first base station and the second base station may be configured identically or similarly to the first base station 111 and the second base station 121 described with reference to FIG. 1, the first base station 311 and the second base station 321 described with reference to FIG. 3, and the first base station and the second base station described with reference to FIG. 4. The first base station and the second base station may correspond to ABSs. The one or more first communication nodes 731 and 732 may be configured identically or similarly to the one or more users or terminals 131, 132, and 133 described with reference to FIG. 1, the first communication node 330 described with reference to FIG. 3, and the first communication node described with reference to FIG. 4. The first hub 740 may be configured identically or similarly to the first hub 140 described with reference to FIG. 1, the first hub described with reference to FIG. 3, and the first hub described with reference to FIG. 4. Some or all of the first base station, the second base station, the one or more first communication nodes 731 and 732, the first hub 740, and the first control apparatus 780 may be configured identically or similarly to the communication node 200 described with reference to FIG. 2. Hereinafter, in describing a second exemplary embodiment of a method for replacing an ABS with reference to FIGS. 7A and 7B, content overlapping with those described with reference to FIGS. 1 to 4 may be omitted.

The first control apparatus 780 may perform the base station replacement operation by controlling the positions of the first and second base stations. For example, the first control apparatus may determine to replace the first base station, which is included in the first AVS 710 to form a first cell 715 and provide services to the one or more first communication nodes 731 and 732, with the second base station included in the second AVS 720. The first control apparatus 780 may move the second base station in the direction of the first base station in order to perform the base station replacement. As the second base station moves in the direction of the first base station, the coverages of the first cell 715 and the second cell 725 formed by the first base station and the second base station may overlap fully or partially.

Referring to FIGS. 7A and 7B, the first control apparatus 780 may control the first AVS 710 to move to a different position in the situation where the coverages of the first cell 715 and the second cell 725 overlap fully or partially, so that the coverage of the first cell 715 deviates from the existing position. On the other hand, the first control apparatus 780 may control the second AVS 720 to move to the existing position of the first AVS 710, so that the coverage of the second cell 725 is formed in the existing position of the coverage of the first cell 715.

As the positions of the respective coverages of the first cell 715 and the second cell 725 are changed, the one or more communication nodes 731 and 732 located within the existing coverage of the first cell 715 may be located within the coverage of the second cell 725. Through this, the one or more communication nodes 731 and 732 may perform handover from the first cell 715 or the first base station to the second cell 725 or the second base station. When it is confirmed that all of the one or more first communication nodes 731 and 732 have handed over to the second base station, it may be determined that the base station replacement procedure has been successfully completed.

Figure 8A:
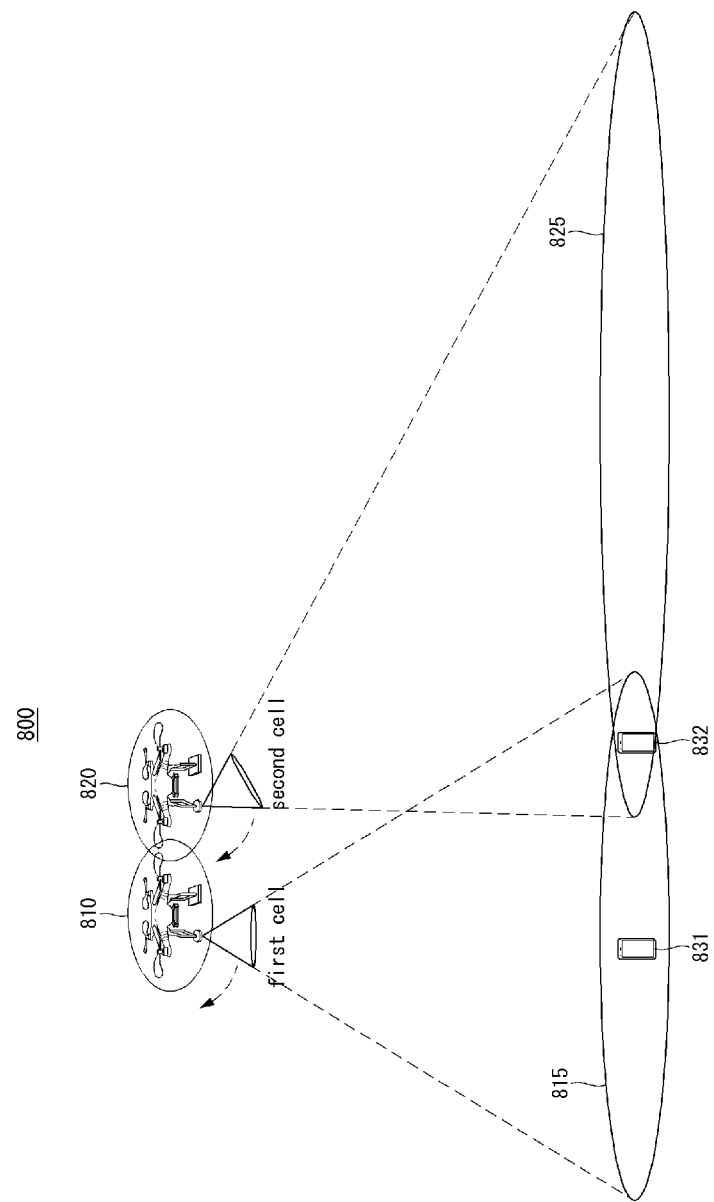
FIGS. 8A and 8B are conceptual diagrams for describing a third exemplary embodiment of an ABS replacement method in a communication system.
Figure 8B:
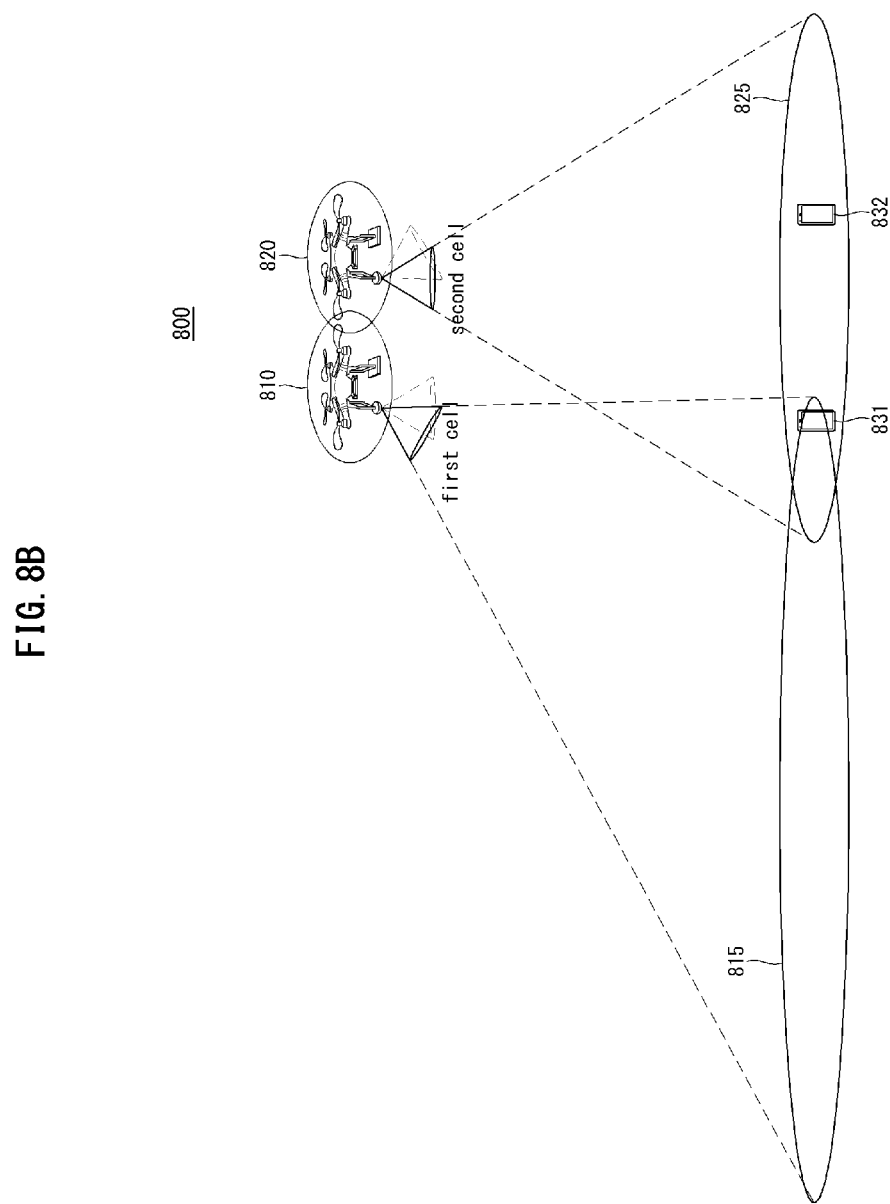

FIGS. 8A and 8B are conceptual diagrams for describing a third exemplary embodiment of an ABS replacement method in a communication system.

Referring to FIGS. 8A and 8B, a communication system 800 may include a first AVS 810, a second AVS 820, a first control apparatus (not shown), and the like. The communication system 800 may include a first base station and a second base station respectively included in the first AVS 810 and the second mobile AVS 820, and one or more first communication nodes 831 and 832 connected to the first base station to receive services. The communication system 800 may further include a first hub (not shown) that connects the first AVS 810 and the second AVS 820 with the first control apparatus (not shown) and/or a core network (not shown).

Here, the first AVS 810, the second AVS 820, and components thereof may be configured identically or similarly to the first AVS 110 and the second AVS 120 described with reference to FIG. 1, the first AVS 310 and the second AVS 320 described with reference to FIG. 3, the first AVS, the second AVS, and the components thereof described with reference to FIG. 4. The first base station and the second base station may be configured identically or similarly to the first base station 111 and the second base station 121 described with reference to FIG. 1, the first base station 311 and the second base station 321 described with reference to FIG. 3, and the first base station and the second base station described with reference to FIG. 4. The first base station and the second base station may correspond to ABSs. The one or more first communication nodes 831 and 832 may be configured identically or similarly to the one or more users or terminals 131, 132, and 133 described with reference to FIG. 1, the first communication node 330 described with reference to FIG. 3, and the first communication node described with reference to FIG. 4. The first hub (not shown) may be configured identically or similarly to the first hub 140 described with reference to FIG. 1, the first hub described with reference to FIG. 3, and the first hub described with reference to FIG. 4. Some or all of the first base station, the second base station, the one or more first communication nodes 831 and 832, the first hub (not shown), and the first control apparatus (not shown) may be configured identically or similarly to the communication node 200 described with reference to FIG. 2. Hereinafter, in describing a third exemplary embodiment of a method for replacing an ABS with reference to FIGS. 8A and 8B, content overlapping with those described with reference to FIGS. 1 to 4 may be omitted.

The first control apparatus (not shown) may perform the base station replacement operation by controlling directions of antennas of the first and second base stations. For example, the first control apparatus may determine to replace the first base station, which is included in the first AVS 810 to form a first cell 815 and provide services to the one or more first communication nodes 831 and 832, with the second base station included in the second AVS 820. The first control apparatus may move the second base station in the direction of the first base station in order to perform the base station replacement. As the second base station moves in the direction of the first base station, the coverages of the first cell 815 and the second cell 825 formed by the first base station and the second base station may overlap fully or partially.

Referring to FIGS. 8A and 8B, the first control apparatus may control the first AVS 810 to change an angle of the antenna of the first base station to an angle different from the existing angle in the situation where the coverages of the first cell 815 and the second cell 825 overlap fully or partially, so that the coverage of the first cell 815 deviates from the existing position. On the other hand, the first control apparatus may control the second AVS 820 to change an angle of the antenna of the second base station to an angle different from the existing angle, so that the coverage of the second cell 825 is formed in the existing position of the coverage of the first cell 815.

As the positions of the respective coverages of the first cell 815 and the second cell 825 are changed, the one or more communication nodes 831 and 832 located within the existing coverage of the first cell 815 may be located within the coverage of the second cell 825. Through this, the one or more communication nodes 831 and 832 may perform handover from the first cell 815 or the first base station to the second cell 825 or the second base station. When it is confirmed that all of the one or more first communication nodes 831 and 832 have handed over to the second base station, it may be determined that the base station replacement procedure has been successfully completed.

Figure 9B:
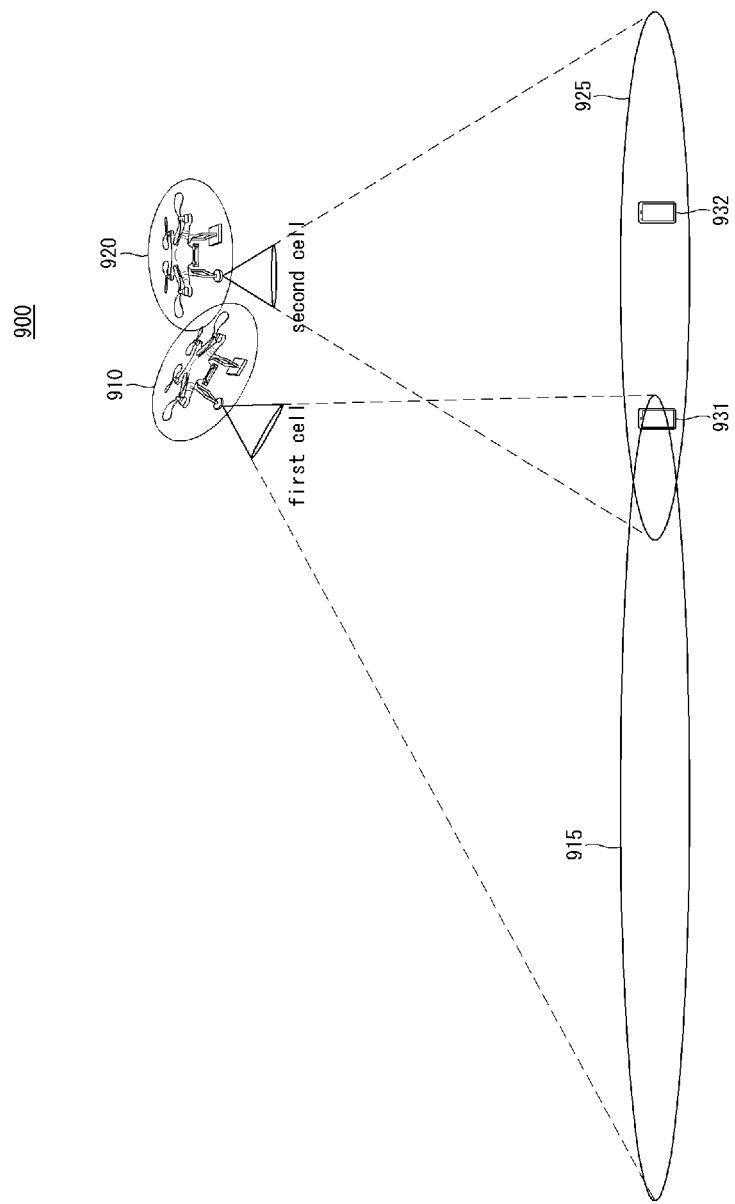

FIGS. 9A and 9B are conceptual diagrams for describing a fourth exemplary embodiment of an ABS replacement method in a communication system.

Referring to FIGS. 9A and 9B, a communication system 900 may include a first AVS 910, a second AVS 920, a first control apparatus (not shown), and the like. The communication system 900 may include a first base station and a second base station respectively included in the first AVS 910 and the second mobile AVS 920, and one or more first communication nodes 931 and 932 connected to the first base station to receive services. The communication system 900 may further include a first hub (not shown) that connects the first AVS 910 and the second AVS 920 with the first control apparatus (not shown) and/or a core network (not shown).

Here, the first AVS 910, the second AVS 920, and components thereof may be configured identically or similarly to the first AVS 110 and the second AVS 120 described with reference to FIG. 1, the first AVS 310 and the second AVS 320 described with reference to FIG. 3, the first AVS, the second AVS, and the components thereof described with reference to FIG. 4. The first base station and the second base station may be configured identically or similarly to the first base station 111 and the second base station 121 described with reference to FIG. 1, the first base station 311 and the second base station 321 described with reference to FIG. 3, and the first base station and the second base station described with reference to FIG. 4. The first base station and the second base station may correspond to ABSs. The one or more first communication nodes 931 and 932 may be configured identically or similarly to the one or more users or terminals 131, 132, and 133 described with reference to FIG. 1, the first communication node 330 described with reference to FIG. 3, and the first communication node described with reference to FIG. 4. The first hub (not shown) may be configured identically or similarly to the first hub 140 described with reference to FIG. 1, the first hub described with reference to FIG. 3, and the first hub described with reference to FIG. 4. Some or all of the first base station, the second base station, the one or more first communication nodes 931 and 932, the first hub (not shown), and the first control apparatus (not shown) may be configured identically or similarly to the communication node 200 described with reference to FIG. 2. Hereinafter, in describing a fourth exemplary embodiment of a method for replacing an ABS with reference to FIGS. 9A and 9B, content overlapping with those described with reference to FIGS. 1 to 4 may be omitted.

The first control apparatus (not shown) may perform the base station replacement operation by controlling directions of first and second AVs on which the first and second base stations are respectively mounted. For example, the first control apparatus may determine to replace the first base station, which is included in the first AVS 910 to form a first cell 915 and provide services to the one or more first communication nodes 931 and 932, with the second base station included in the second AVS 920. The first control apparatus may move the second base station in the direction of the first base station in order to perform the base station replacement. As the second base station moves in the direction of the first base station, the coverages of the first cell 915 and the second cell 925 formed by the first base station and the second base station may overlap fully or partially.

Referring to FIGS. 9A and 9B, the first control apparatus may control the direction of the first AV to be changed from the existing direction in the situation where the coverages of the first cell 915 and the second cell 925 overlap fully or partially, so that the coverage of the first cell 915 deviates from the existing position. On the other hand, the first control apparatus may control the direction of the second AV to be changed from the existing direction in the situation where the coverages of the first cell 915 and the second cell 925 overlap fully or partially, so that the coverage of the second cell 925 is formed in the existing position of the coverage of the first cell 915.

As the positions of the respective coverages of the first cell 915 and the second cell 925 are changed, the one or more communication nodes 931 and 932 located within the existing coverage of the first cell 915 may be located within the coverage of the second cell 925. Through this, the one or more communication nodes 931 and 932 may perform handover from the first cell 915 or the first base station to the second cell 925 or the second base station. When it is confirmed that all of the one or more first communication nodes 931 and 932 have handed over to the second base station, it may be determined that the base station replacement procedure has been successfully completed.

Figure 10A:
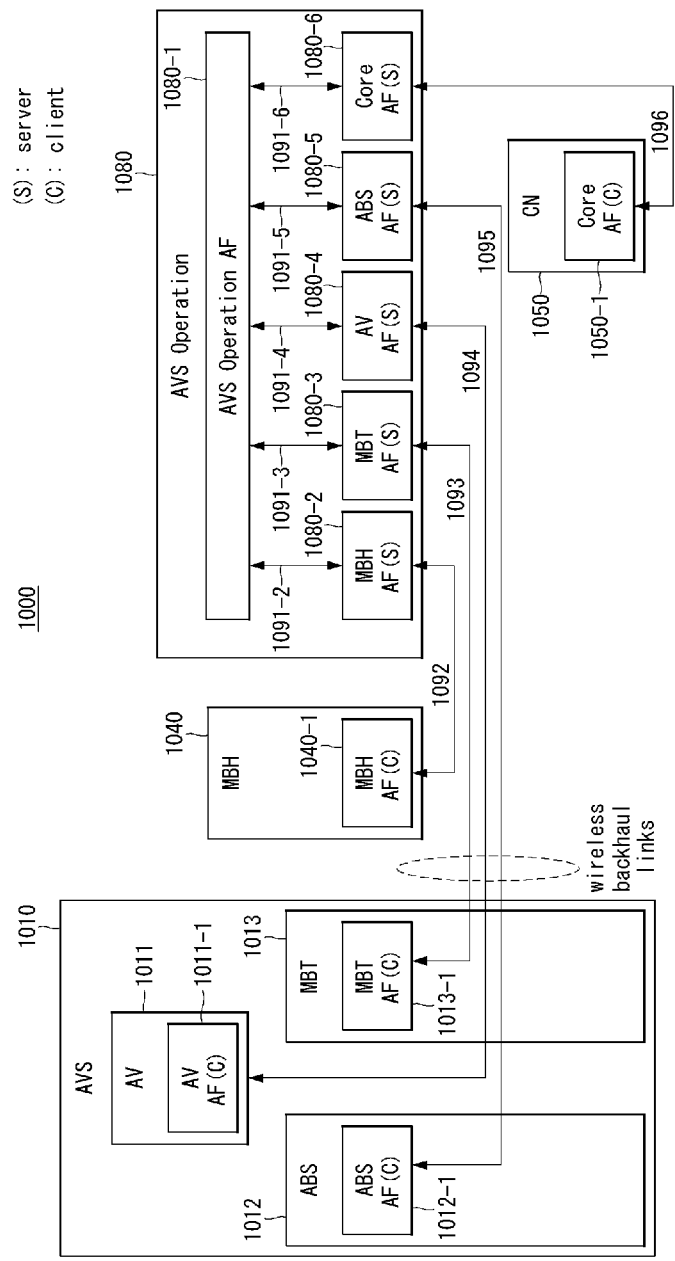
FIGS. 10A and 10B are block diagrams for describing an exemplary embodiment of an apparatus for controlling ABSs in a communication system.
Figure 10B:
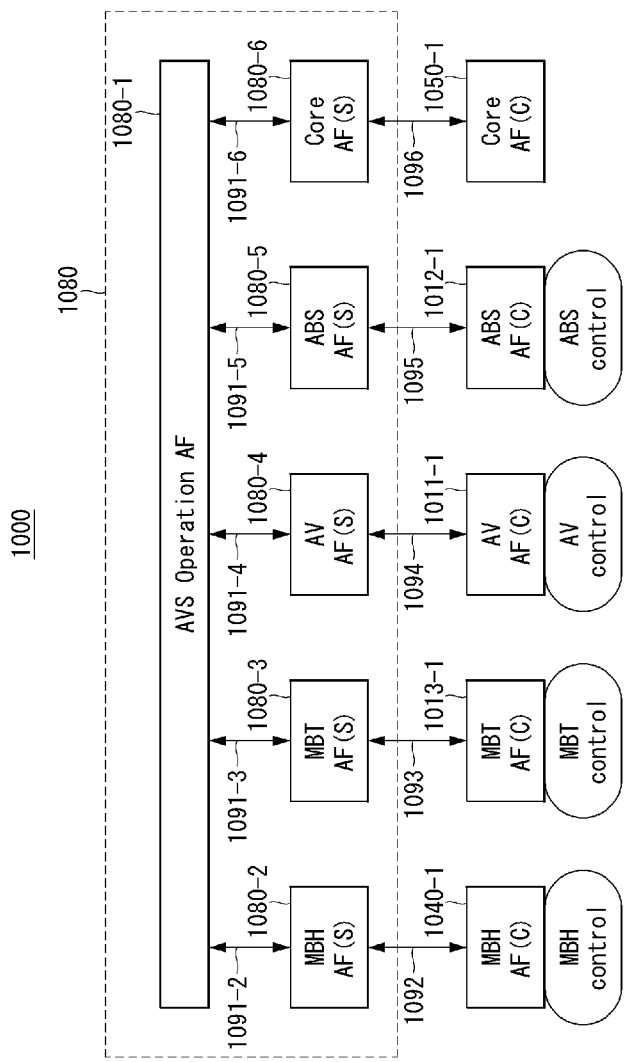

FIGS. 10A and 10B are block diagrams for describing an exemplary embodiment of an apparatus for controlling ABSs in a communication system.

Referring to FIGS. 10A and 10B, a communication system 1000 may include an ABS control apparatus 1080. The ABS control apparatus 380 may be connected to one or more AVSs 1010, an MBH 1040, a core network (CN) 1050, and the like included in the communication system 300 in a wired or wireless communication scheme. The ABS apparatus 1080 may perform ABS control operations through control operations on at least some of the connected AVS 1010, MBH 1040, and CN 1050. Here, the communication system 1000 may be configured identically or similarly to at least some of the communication system 100 described with reference to FIG. 1, the communication system 300 described with reference to FIG. 3, the communication system described with reference to FIG. 4, the communication system 500 described with reference to FIG. 5, the communication system 700 described with reference to FIGS. 7A and 7B, the communication system 800 described with reference to FIGS. 8A and 8B, and the communication system 900 described with reference to FIGS. 9A and 9B. In other words, the communication system 100 described with reference to FIG. 1, at least some of the communication system 300 described with reference to FIG. 3, the communication system described with reference to FIG. 4, the communication system 500 described with reference to FIG. 5, the communication system 700 described with reference to FIGS. 7A and 7B, the communication system 800 described with reference to FIGS. 8A and 8B, and the communication system 900 described with reference to FIGS. 9A and 9B may be configured identically or similar to the communication system 1000 described with reference to FIGS. 10A and 10B. The AVS 1010 may be configured identically or similarly to at least some of the first and/or second AVS 110 and 120 described with reference to FIG. 1, the first and/or second AVS 310 and 320 described with reference to FIG. 3, the first and/or second AVS described with reference to FIG. 4, the first and/or second AVS 510 and 520 described with reference to FIG. 5, the first and/or second AVS 710 and 720 with reference to FIGS. 7A and 7B, the first and/or second AVS 810 and 820 described with reference to FIGS. 8A and 8B, and the first and/or second AVS 910 and 920 described with reference to FIGS. 9A and 9B. For example, the AVS 1010 may include an ABS 1011, an AV 1012, and an MBT 1013. The MBH 1040 may be configured identically or similarly to the first hub 140 described with reference to FIG. 1, the first hub 540 described with reference to FIG. 5, the first hub 740 described with reference to FIGS. 7A and 7B, the first hub described with reference to FIGS. 8A and 8B, and the first hub described with reference to FIGS. 9A and 9B. The CN 1050 may be configured identically or similarly to the core network 150 described with reference to FIG. 1. The ABS control apparatus 1080 may be configured identically or similarly to the first control apparatus 180 described with reference to FIG. 1, the first control apparatus 580 described with reference to FIG. 5, the first control apparatus 780 described with reference to FIGS. 7A and 7B, the first control apparatus described with reference to FIGS. 8A and 8B, and the first control apparatus described with reference to FIGS. 9A and 9B. The ABS control operations performed by the ABS control apparatus 1080 may be performed based on at least some of the steps according to the ABS control method described with reference to FIG. 4.

In the system, the ABS control apparatus 1080 may be referred to as an 'AVS operation apparatus', 'AVS operation server', or 'AVS operation'. The ABS control apparatus 1080 may include one or more application functions (AFs) for controlling the aerial base stations or AVS. The ABS control apparatus 1080 may include an AVS operation AF 1080-1, MBH AF(S) 1080-2, MBT AF(S) 1080-3, AV AF(S) 1080-4, ABS AF(S) 1080-5, Core AF(S) 1080-6, and the like. Here, the AVS operation AF 1080-1 may establish connection 1091-2, 1091-3, 1091-4, 1091-5 or 1091-6 with each of the one or more AFs 1080-2, 1080-3, 1080-4, 1080-5, and 1080-6 included in the ABS control apparatus 1080. The AVS operation AF 1080-1 may control the one or more connected AFs 1080-2, 1080-3, 1080-4, 1080-5, and 1080-6. Alternatively, the AVS operation AF 1080-1 may perform control on other entities by being connected to AFs of other entities of the communication system 1000 through other AFs 1080-2, 1080-3, 1080-4, 1080-5, and 1080-6 included in the ABS control apparatus 380. Primitives, messages, information, etc. transmitted between the ABS control apparatus 1080 and the respective entities for control may be transmitted through one or a combination of two or more among system information (e.g., master information block (MIB), system information block (SIB)), radio resource control (RRC) message, medium access control (MAC) control element (CE), and control information (e.g., downlink control information (DCI), uplink control information (UCI), sidelink control information (SCI)).

The AVS operation AF 1080-1 may be connected to an MBH AF(C) 1040-1 corresponding to a client-side AF of the MBH 1040 through the MBH AF(S) 1080-2 corresponding to a server-side AF. The AVS operation AF 1080-1 may be connected to an MBT AF(C) 1013-1 corresponding to a client-side AF of the MBT 1013 through the MBT AF(S) 1080-3 corresponding to a service-side AF. The AVS operation AF 1080-1 may be connected to an AV AF(C) 1012-1 corresponding to a client-side AF of the AV 1012 through the AV AF(S) 1080-4 corresponding to a server-end AF. The AVS operation AF 1080-1 may be connected to an ABS AF(C) 1011-1 corresponding to a client-side AF of the ABS 1011 through the ABS AF(S) 1080-5 corresponding to a server-side AF. The AVS operation AF 1080-1 may be connected to a Core AF(C) 1050-1 corresponding to a client-side AF of the CN 1050 through the Core AF(S) 1080-6 corresponding to a server-side AF. Each of the one or more server-side AFs 1080-2, 1080-3, 1080-4, 1080-5, and 1080-6 included in the ABS control apparatus 1080 may establish connection 1092, 1093, 1094, 1095, or 1096 with each of the one or more client-side AFs 1040-1, 1013-1, 1012-1, 1011-1, and 1050-1 included in different entities. The AVS operation AF 1080-1 may perform communications with other entities and control on other entities through the connections 1092, 1093, 1094, 1095, and 1096 between the one or more server-side AFs 1080-2, 1080-3, 1080-4, 1080-5, and 1080-6 and the one or more client-side AFs 1040-1, 1013-1, 1012-1, 1011-1, and 1050-1.

Referring to FIG. 10A, a wireless backhaul link may be formed between the MBH 1040 and the AVS 1010 or the MBT 1013. The wireless backhaul link formed between the MBH 1040 and the MBT 1013 may be divided into two or more according to operations or tasks to be performed by the AVS 1010. For example, the wireless backhaul link formed between the MBH 1040 and the MBT 1013 may be divided into a backhaul control plane protocol data unit session (i.e., BH CP PDU session) and a backhaul user plane protocol data unit session (i.e., BH UP PDU session). The BH UP PDU session may process a CP traffic and a UP traffic of the ABS with a BH ABS CP PDU session and a BH ABS UP PDU session, respectively. The ABS control apparatus 1080 may process data for controlling each entity for operations or tasks to be performed by the AVS through the BH CP PDU session.

Referring to FIG. 10B, the AVS operation AF 1080-1 may establish connections 1091-2, 1091-3, 1091-4, 1091-5, and 1091-6 with the one or more AFs 1080-2, 1080-3, 1080-4, 1080-5, and 1080-6 included in the ABS control apparatus 1080, respectively. The one or more server-side AFs 1080-2, 1080-3, 1080-4, 1080-5, and 1080-6 included in the ABS control apparatus 1080 may establish connections 1092, 1093, 1094, 1095, and 1096 with the client-side AFs 1040-1, 1013-1, 1012-1, 1011-1, and 1050-1 included in different entities, respectively. Here, primitive groups may be defined between the respective connections 1011-1, 1012-1, 1013-1, 1040-1, 1050-1, 1092, 1093, 1094, 1095, and 1096 established between the respective AFs.

For example, a primitive group defined in a direction of the MBH AF(S) 1980-2 between the AVS Operation AF 1080-1 and the MBH AF(S) 1080-2 may be referred to as 'AVSMBH_Primitives'. A primitive group defined between in a direction of the AVS operation AF 1080-1 between the AVS Operation AF 1080-1 and the MBH AF(S) 1080-2 may be referred to as 'MBHAVS_Primitives'. A primitive group defined in a direction of the MBT AF(S) 1080-3 between the AVS Operation AF 1080-1 and the MBT AF(S) 1080-3 may be referred to as 'AVSMBT_Primitives'. A primitive group defined in a direction of the AVS operation AF 1080-1 between the AVS Operation AF 1080-1 and the MBT AF(S) 1080-3 may be referred to as 'MBTAVS_Primitives'. A primitive group defined in a direction of the AV AF(S) 1080-4 between the AVS Operation AF 1080-1 and the AV AF(S) 1080-4 may be referred to as 'AVSAV_Primitives'. A primitive group defined in a direction of the AVS operation AF 1080-1 between the AVS operation AF 1080-1 and the AV AF(S) 1080-4 may be referred to as 'AVAVS_Primitives'. A primitive group defined in a direction of the ABS AF(S) 1080-5 between the AVS Operation AF 1080-1 and the ABS AF(S) 1080-5 may be referred to as 'AVS-ABS_Primitives'. A primitive group defined in a direction of the AVS operation AF 1080-1 between the AVS operation AF 1080-1 and the ABS AF(S) 1080-5 may be referred to as 'ABSAVS_Primitives'. A primitive group defined in a direction of the Core AF(S) 1080-6 between the AVS Operation AF 1080-1 and the Core AF(S) 1080-6 may be referred to as 'AVSCore_Primitives'. A primitive group defined in a direction of the AVS Operation AF 1080-1 between the AVS Operation AF 1080-1 and the Core AF(S) 1080-6 may be referred to as 'CoreAVS_Primitives'.

Meanwhile, a primitive group defined in a direction of the MBH AF(C) 1040-1 between the MBH AF(S) 1080-2 and the MBH AF(C) 1040-1 may be referred to as 'MBH_SC_Primitives'. A primitive group defined in a direction of the MBH AF(S) 1080-2 between the MBH AF(S) 1080-2 and the MBH AF(C) 1040-1 may be referred to as 'MBH_CS_Primitives'. A primitive group defined in a direction of the MBT AF(C) 1013-1 between the MBT AF(S) 1080-3 and the MBT AF(C) 1013-1 may be referred to as 'MBT_SC_Primitives'. A primitive group defined in a direction of the MBT AF(S) 1080-3 between the MBT AF(S) 1080-3 and the MBT AF(C) 1013-1 may be referred to as 'MBT_CS_Primitives'. A primitive group defined in a direction of the AV AF(C) 1012-1 between the AV AF(S) 1080-4 and the AV AF(C) 1012-1 may be referred to as 'AV_SC_Primitives'. A primitive group defined in a direction of the AV AF(S) 1080-4 between the AV AF(S) 1080-4 and the AV AF(C) 1012-1 may be referred to as 'AV_CS_Primitives'. A primitive group defined in a direction of the ABS AF(C) 1011-1 between the ABS AF(S) 1080-5 and the ABS AF(C) 1011-1 may be referred to as 'ABS_SC_Primitives'. A primitive group defined in a direction of the ABS AF(S) 1080-5 between the ABS AF(S) 1080-5 and the ABS AF(C) 1011-1 may be referred to as 'ABS_CS_Primitives'. A primitive group defined in a direction of the Core AF(C) 1050-1 between the Core AF(S)

1080-6 and the Core AF(C) 1050-1 may be referred to as 'Core_SC_Primitives'. A primitive group defined in a direction of the Core AF(S) 1080-6 between the Core AF(S) 1080-6 and the Core AF(C) 1050-1 may be referred to as 'Core_CS_Primitives'.

The ABS control apparatus 380 may perform a control operation on each entity through detail primitives defined in the primitive group defined between the respective AFs. For example, in Table 1, it can be seen that each primitive group and detailed primitives defined and used for MBH control, MBT control, AV control, ABS control, etc. shown in FIG. 10B are represented.

TABLE 1

| Control object | Primitive group | Detail primitives |
|---|---|---|
| MBH control | MBH_SC_Primitives | MBH_3DAntennaPointing_Req |
|  | MBH_CS_Primitives | MBH_3DAntennaPointing_Cnf |
| MBT control | MBT_SC_Primitives | MBT_3DAntennaPointing_Req |
|  | MBT_CS_Primitives | MBT_3DAntennaPointing_Cnf |
| AV control | AV_SC_Primitives | AV_AV3DPositionPointing_Req |
|  | AV_CS_Primitives | AV_AV3DPositionPointing_Cnf |
| ABS control | ABS_SC_Primitives | ABS_TXPWERControl_Req |
|  |  | ABS_3DAntennaPointing_Req |
|  | ABS_CS_Primitives | ABS_TXPWERControl_Cnf |
|  |  | ABS_3DAntennaPointing_Cnf |

Each of the detailed primitives shown in Table 1 may correspond to a primitive including an instruction for any one of the operations of each entity described with reference to FIGS. 4 to 9B, or a primitive including a response to the instruction. Referring to Table 1, the MBH 1040, MBT 1013, AV 1012, ABS 1011, or the like may receive a primitive or message requesting (i.e., Req) or instructing a predetermined operation from the ABS control apparatus 1080 or the server-side AF 1080-2, 1080-3, 1080-4, 1080-5, or the like included in the ABS control apparatus 1080, and may return a primitive or message confirming (i.e., Cnf) or indicating whether the indicated operation has been performed or a result thereof. For example, the MBH 1040, the MBT 1013, the ABS 1011, or the like may perform controls on the direction of the antenna based on the MBH_3DAntennaPointing_Req primitive, the MBT_3DAntennaPointing_Req primitive, the ABS_3DAntennaPointing_Req primitive, or the like indicating direction control for the antennas included in each. The AV 1012 may perform controls on the positions based on the AV_AV3DPositionPointing_Req primitive indicating control of the position of the AV 1012. The ABS 1011 may perform transmit power adjustment based on the ABS_TXPWERControl_Req primitive indicating transmit power adjustment.

According to the exemplary embodiments of the present disclosure, in a process of replacing an ABS providing services in a predetermined communication area with another ABS, transmit powers, vertical/horizontal positions, directions of AVs, and/or directions of antennas of the ABSs can be controlled. Through this, handover of users or terminals receiving the services can be easily and quickly performed. Accordingly, connectivity of services that have been provided to users or terminals can be maintained or guaranteed, and reliability of a radio access network formed through the ABSs can be improved.

However, the effects that can be achieved by the methods and apparatuses according to the exemplary embodiments of the present disclosure, are not limited to those mentioned above, and other effects not mentioned may be clearly understood by those of ordinary skill in the art to which the present disclosure belongs from the configurations described in the present disclosure.

The exemplary embodiments of the present disclosure may be implemented as program instructions executable by a variety of computers and recorded on a computer-readable medium. The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the exemplary embodiments of the present disclosure and their advantages have been described in detail, it should be understood that various changes, substitutions and alterations may be made herein without departing from the scope of the present disclosure.

What is claimed is:

1. A method for controlling base stations in a wireless communication system, the method comprising:
   performing a monitoring operation on a first base station that is mounted on a first aerial vehicle and forms a first cell in a predetermined communication area at a predetermined aerial position;
   determining whether the first base station needs to be replaced;
   in response to determining that the first base station needs to be replaced, controlling a second base station mounted on a second aerial vehicle to move in a direction of the first base station and form a second cell;
   in response to determining that coverages of the first and second cells overlap by more than a first reference value, decreasing a transmit power of the first base station and increasing a transmit power of the second base station; and
   in response to identifying that all of one or more communication nodes, which were connected to the first cell, are handed over to the second base station, determining that the first base station is successfully replaced with the second base station.

2. The method according to claim 1, wherein the performing of the monitoring operation comprises: identifying at least one of a remaining amount of a power source of the first aerial vehicle, whether the first aerial vehicle or a first aerial vehicle system including the first base station operates normally, or a combination thereof.

3. The method according to claim 2, wherein the determining of whether the first base station needs to be replaced comprises: in response to determining that the remaining amount of the power source of the first aerial vehicle is less than a first preset threshold, determining that the first base station needs to be replaced.

4. The method according to claim 2, wherein the determining of whether the first base station needs to be replaced comprises: in response to determining that a part of one or more components constituting the first aerial vehicle system does not operate normally, determining that the first base station needs to be replaced.

5. The method according to claim 1, wherein the decreasing of the transmit power of the first base station and the increasing of the transmit power of the second base station comprises:

decreasing the transmit power of the first base station based on a first function; and increasing the transmit power of the second base station based on a second function.

6. The method according to claim 5, wherein the first and second functions correspond to linear functions or non-linear functions that are configured to derive a constant function when mutually summed.

7. A method for controlling base stations in a wireless communication system, the method comprising:

performing a monitoring operation on a first base station that is mounted on a first aerial vehicle and forms a first cell in a predetermined communication area at a predetermined aerial position;

determining whether the first base station needs to be replaced;

in response to determining that the first base station needs to be replaced, controlling a second base station mounted on a second aerial vehicle to move in a direction of the first base station and form a second cell;

in response to determining that coverages of the first and second cells overlap by more than a first reference value, changing each of the coverages of the first and second cells through physical controls on a first aerial vehicle system including the first base station and a second aerial vehicle system including the second base station; and in response to identifying that all of one or more communication nodes, which were connected to the first cell, are located out of the coverage of the first cell and located in the coverage of the second cell, determining that the first base station is successfully replaced with the second base station.

8. The method according to claim 7, wherein the performing of the monitoring operation comprises: identifying at least one of a remaining amount of a power source of the first aerial vehicle, whether the first aerial vehicle or the first aerial vehicle system including the first base station operates normally, or a combination thereof.

9. The method according to claim 7, wherein in the changing of each of the coverages of the first and second cells, the coverages of the first and second cells are respectively changed by moving a position of the first aerial vehicle and a position of the second aerial vehicle.

10. The method according to claim 7, wherein in the changing of each of the coverages of the first and second cells, the coverages of the first and second cells are respectively changed by changing each of a direction in which the first aerial vehicle faces and a direction in which the second aerial vehicle faces.

11. The method according to claim 7, wherein in the changing of each of the coverages of the first and second cells, the coverages of the first and second cells are respectively changed by changing each of a direction in which a first antenna of the first base station faces and a direction in which a second antenna of the second base station faces.

12. An apparatus for controlling base stations in a wireless communication system, the apparatus comprising:

a processor;

a memory electronically communicating with the processor; and instructions stored in the memory, wherein when executed by the processor, the instructions cause the apparatus to:

perform a monitoring operation on a first base station that is mounted on a first aerial vehicle and forms a first cell in a predetermined communication area at a predetermined aerial position;

determine whether the first base station needs to be replaced;

in response to determining that the first base station needs to be replaced, control a second base station mounted on a second aerial vehicle to move in a direction of the first base station and form a second cell;

in response to determining that coverages of the first and second cells overlap by more than a first reference value, perform at least one of an operation of controlling each of transmit powers of the first and second base stations and an operation of changing coverages of the first and second cells through physical controls on a first aerial vehicle system including the first base station and a second aerial vehicle system including the second base station; and in response to identifying that all of one or more communication nodes, which were connected to the first cell, are handed over to the second base station, determine that the first base station is successfully replaced with the second base station.

13. The apparatus according to claim 12, wherein the instructions further cause the apparatus to identify at least one of a remaining amount of a power source of the first aerial vehicle, whether the first aerial vehicle or the first aerial vehicle system including the first base station operates normally, or a combination thereof.

14. The apparatus according to claim 12, wherein in the performing of the operation of controlling each of transmit powers of the first and second base stations, the instructions further cause the apparatus to decrease the transmit power of the first base station based on a first function and increase the transmit power of the second base station based on a second function, and the first and second functions correspond to linear functions or non-linear functions that are configured to derive a constant function when mutually summed.

15. The apparatus according to claim 12, wherein in the performing of the operation of changing coverages of the first and second cells, the instructions further cause the apparatus to control each of the first aerial vehicle and the second aerial vehicle to move a position thereof.

16. The apparatus according to claim 12, wherein in the performing of the operation of changing coverages of the first and second cells, the instructions further cause the apparatus to control each of the first aerial vehicle and the second aerial vehicle to change a direction in which each of the first aerial vehicle and the second aerial vehicle faces.

17. The apparatus according to claim 12, wherein in the performing of the operation of changing coverages of the first and second cells, the instructions further cause the apparatus to control each of the first base station and the second base station to change a direction in which an antenna thereof faces.

18. The apparatus according to claim 12, wherein the instructions further cause the apparatus to perform both the operation of controlling each of the transmit powers of the first and second base stations and the operation of changing the coverages of the first and second cells.

* * * * *